Jan. 1, 1952  F. E. WIRTZ  2,580,871
LACING MACHINE

Filed Oct. 7, 1948  15 Sheets-Sheet 1

INVENTOR
FRANK E. WIRTZ
BY Spencer, Hardman and Fher
HIS  ATTORNEYS

Jan. 1, 1952     F. E. WIRTZ     2,580,871
LACING MACHINE

Filed Oct. 7, 1948     15 Sheets-Sheet 2

INVENTOR
FRANK E. WIRTZ

By Spencer, Hardman
His ATTORNEYS

Jan. 1, 1952  F. E. WIRTZ  2,580,871
LACING MACHINE
Filed Oct. 7, 1948  15 Sheets-Sheet 3

INVENTOR
FRANK E. WIRTZ
BY Spencer, Hardman and Their
HIS ATTORNEYS

Jan. 1, 1952 F. E. WIRTZ 2,580,871
LACING MACHINE

Filed Oct. 7, 1948 15 Sheets-Sheet 5

INVENTOR
FRANK E. WIRTZ

BY Spencer, Hardman and Heber
HIS ATTORNEYS

Jan. 1, 1952

F. E. WIRTZ 2,580,871

LACING MACHINE

Filed Oct. 7, 1948

INVENTOR
FRANK E. WIRTZ

BY Spencer, Hardman
HIS ATTORNEYS

Jan. 1, 1952  F. E. WIRTZ  2,580,871
LACING MACHINE

Filed Oct. 7, 1948  15 Sheets-Sheet 9

INVENTOR
FRANK E. WIRTZ
BY Spencer, Hardman and Pehr
HIS ATTORNEYS

Jan. 1, 1952     F. E. WIRTZ     2,580,871
LACING MACHINE

Filed Oct. 7, 1948     15 Sheets-Sheet 10

INVENTOR
FRANK E. WIRTZ
BY
HIS ATTORNEYS

Jan. 1, 1952  F. E. WIRTZ  2,580,871
LACING MACHINE

Filed Oct. 7, 1948  15 Sheets-Sheet 12

INVENTOR
FRANK E. WIRTZ
BY Spencer, Hardman and Fisher
HIS ATTORNEYS

Jan. 1, 1952  F. E. WIRTZ  2,580,871
LACING MACHINE

Filed Oct. 7, 1948  15 Sheets-Sheet 13

INVENTOR
FRANK E. WIRTZ

BY Spencer, Hardman and Ither
HIS  ATTORNEYS

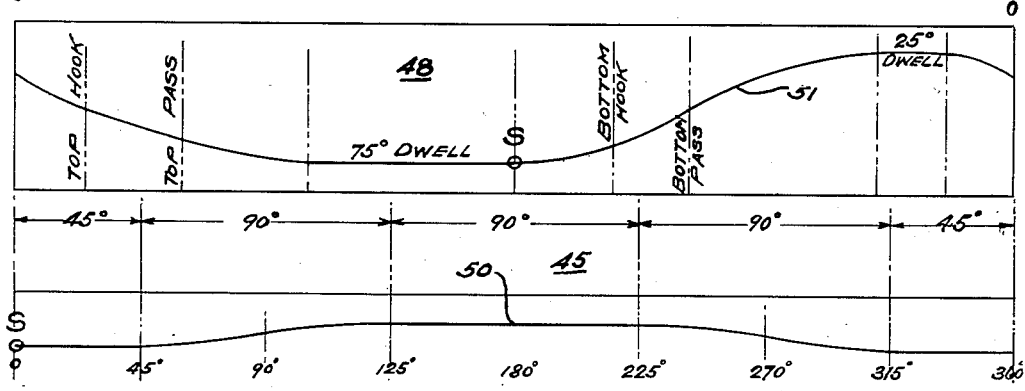
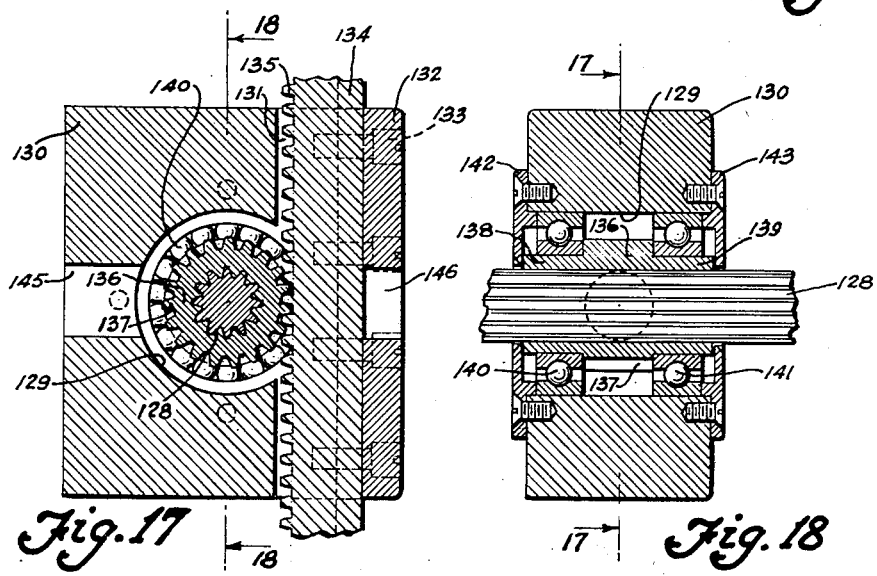
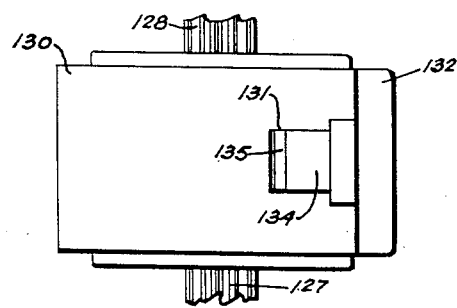

Patented Jan. 1, 1952

2,580,871

UNITED STATES PATENT OFFICE 2,580,871

LACING MACHINE

Frank E. Wirtz, Dayton, Ohio, assignor to General Motors Corporation, Detroit, Mich., a corporation of Delaware Application October 7, 1948, Serial No. 53,335

28 Claims. (Cl. 66—1)

This invention relates to an improved lacing machine particularly adapted to bind cord around the stack of windings protruding from and extending between slots in rotors or stators for electric machines and thereby tie the stack or bundle of windings securely together to prevent their accidental displacement.

One of the objects of the present invention is to provide a machine which, after a wound stator or rotor is placed in proper position thereon, is adapted automatically to lace a binding cord around the winding loops extending from one end of said rotor or stator.

A further object of the present invention is to provide an automatic stator or rotor lacing machine adapted to lace a single cord from a supply spool around the stack of winding loops extending from the rotor or stator, forming interlocking cord loops tightly about said stack of windings extending from the stator or rotor, to tie them securely together and prevent accidental disarrangement or vibration thereof.

By constructing this machine so that a single cord from a supply spool may be laced to form interlocking loops, the necessity of bobbins and therefore the repeated rewinding and replacement of empty bobbins by fully wound ones. is completely eliminated.

One advantage gained by the use of the present machine is that stators or rotors laced thereby are more uniform in the spacing of the binding loops and the tension at which said loops are drawn about the stacked wires, than those laced by the generally used manual method.

Further objects and advantages of the present invention will be apparent from the following description, reference being had to the accompanying drawings wherein a preferred embodiment of the present invention is clearly shown.

Figure 13:
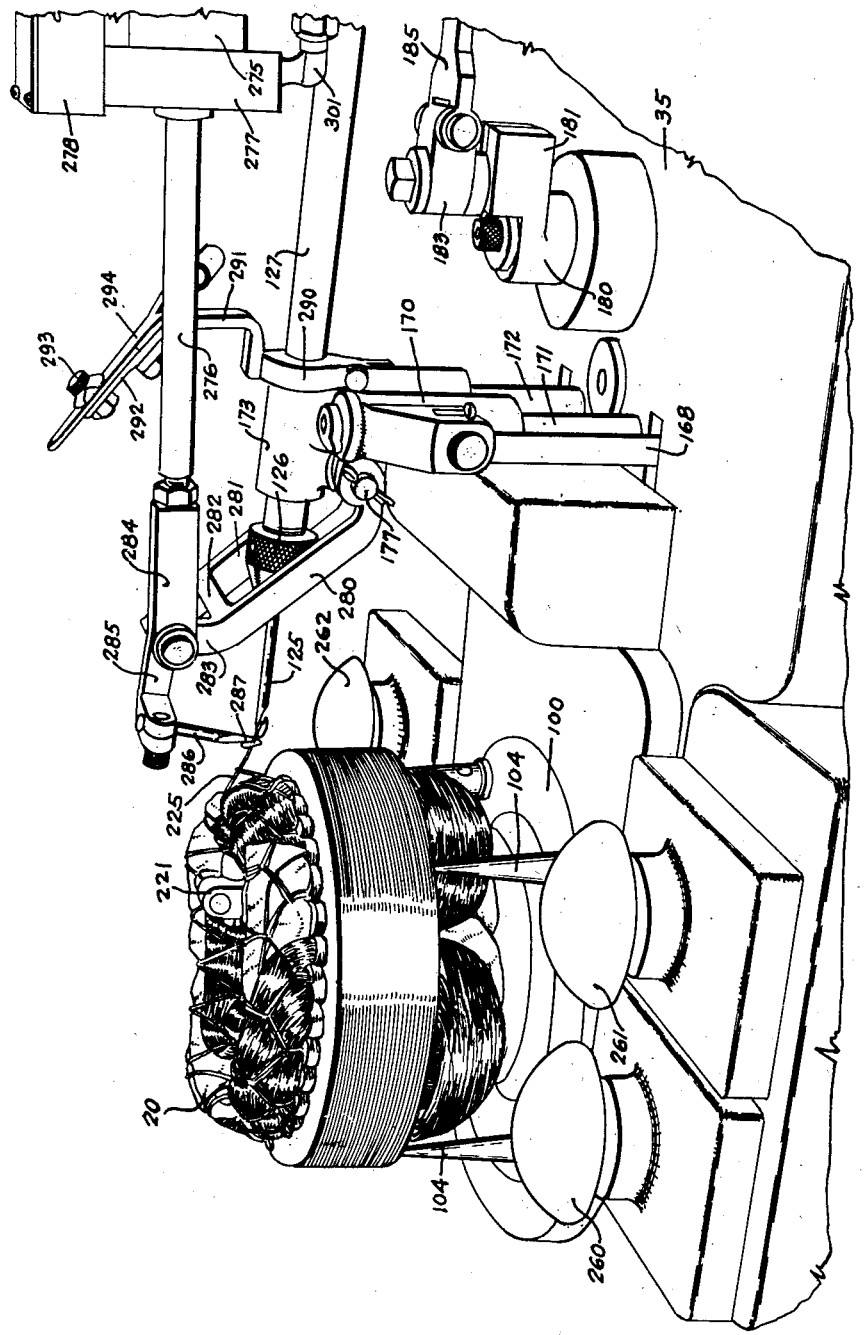
Fig. 13 shows the shear hook engaging the cord when the stator has been completely laced.
Figure 14:
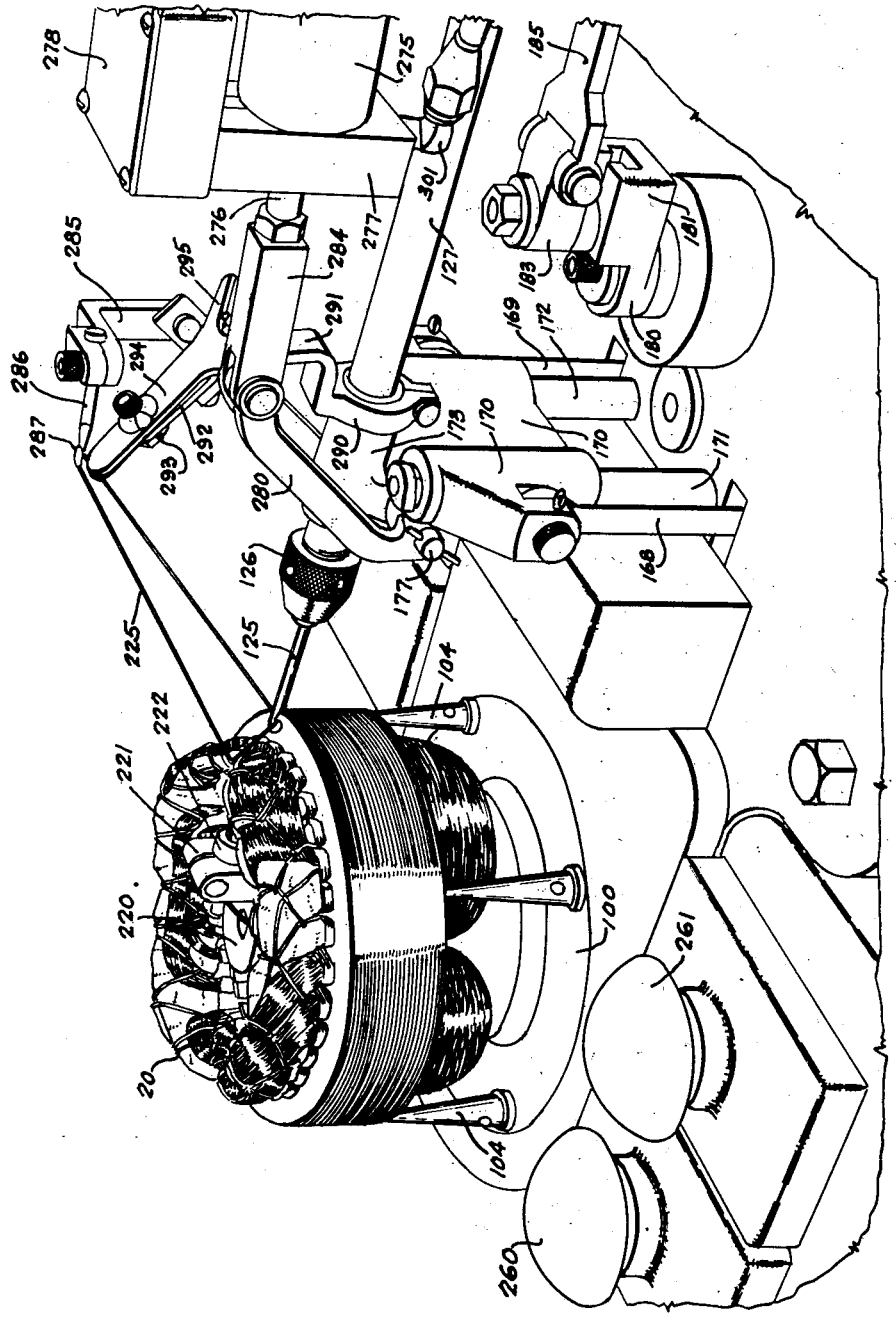

Fig. 14 a sequel to Fig. 13, shows the shear hook locating its hooked cord in proper position relatively to the cut-off shear which severs the cord laced in the stator from the source of supply.

Figure 15:
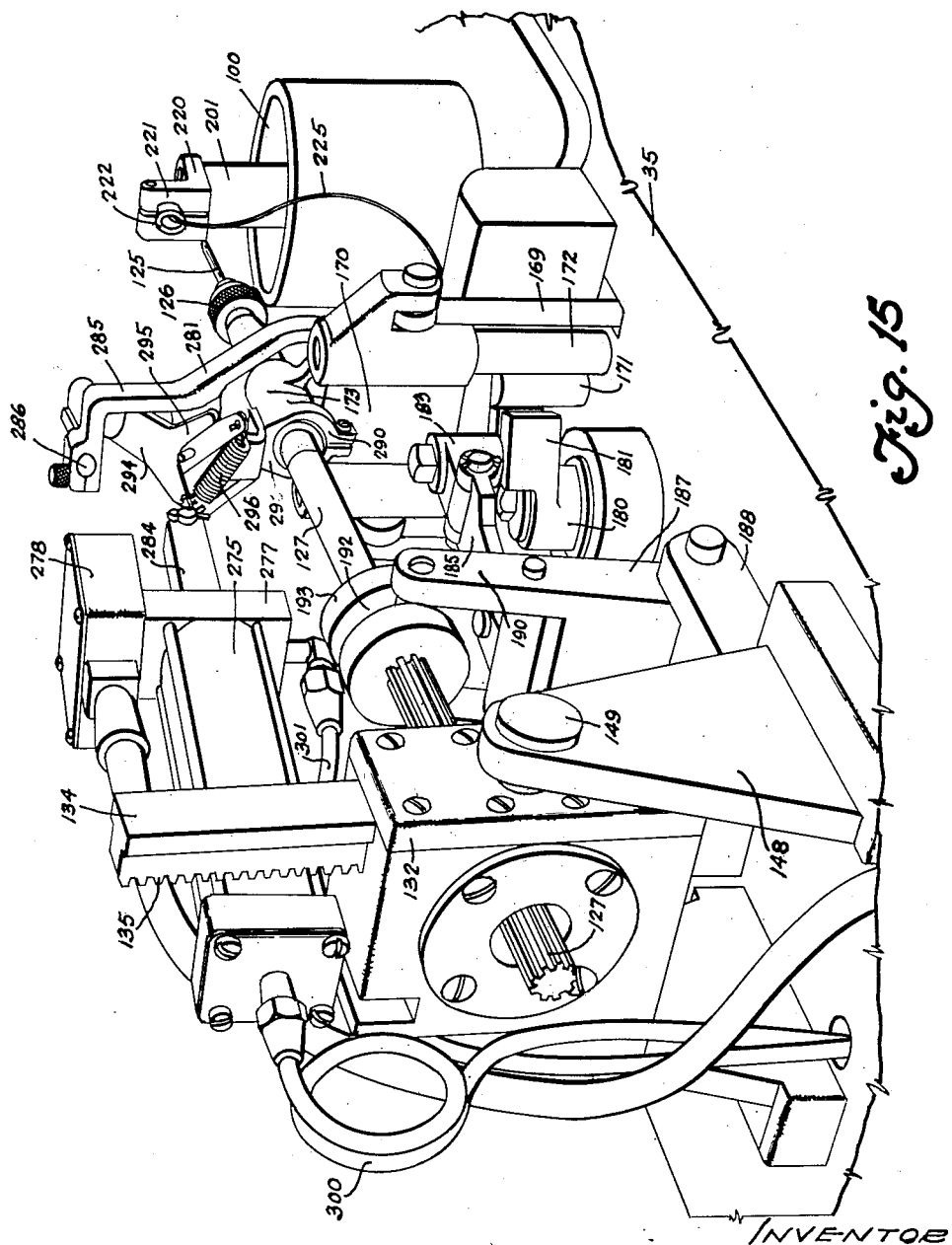

Fig. 15 is a rear perspective view of the needle mechanism.

Fig. 16 is a development chart of the two cam slots in the twin cams.

Fig. 17 is a sectional view of the pivoted driving mechanism of the needle shaft taken along line 17—17 of Fig. 18.

Fig. 18 is a sectional view taken along the line 18—18 of Fig. 17.

Fig. 19 is a plan view of the mechanism shown in Fig. 17.

Figure 20:
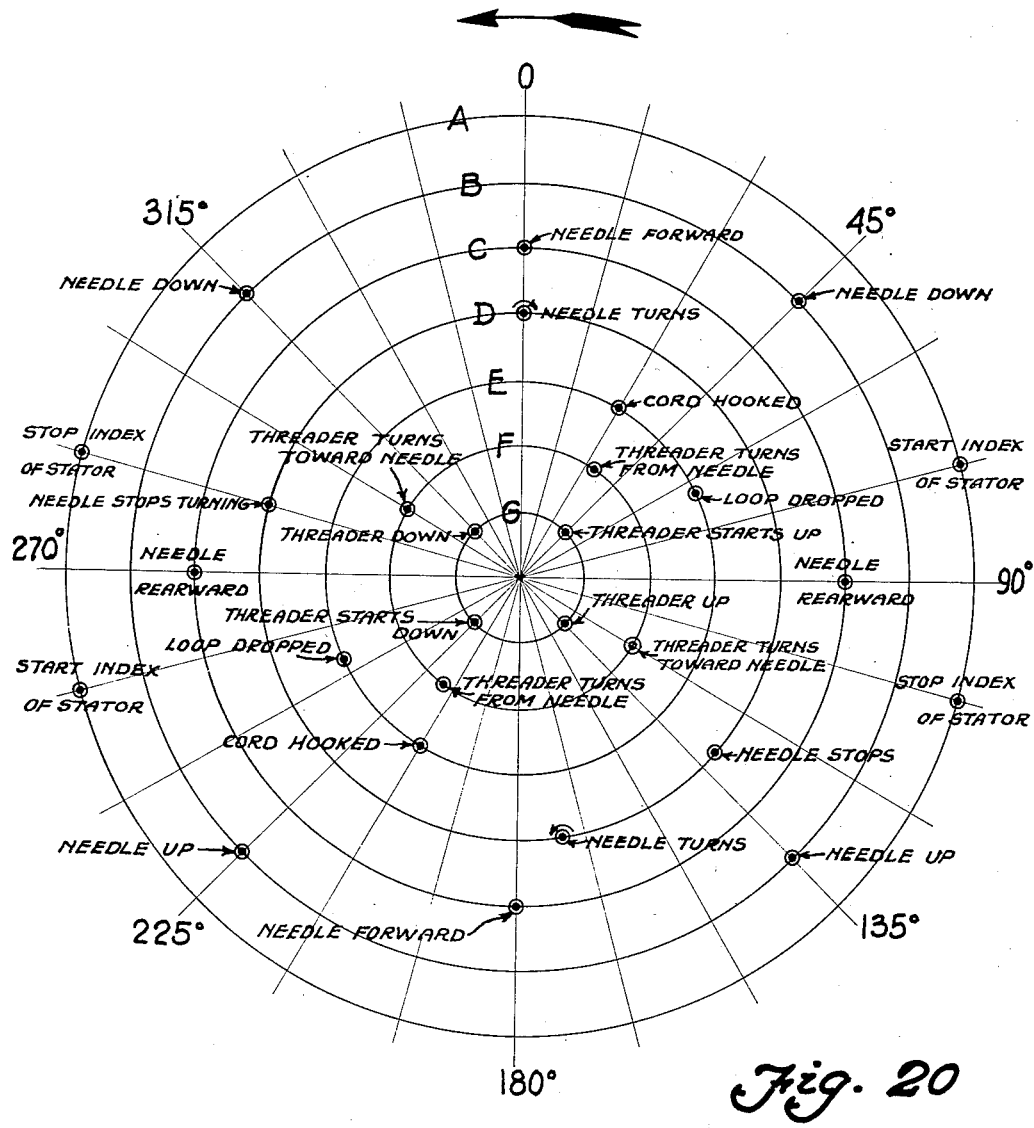

Fig. 20 is a chart showing the status of the stator supporting member, the needle and the threader at 15° intervals during a single rotation of the twin cams.

Certain primary elements of the machine cooperate to lace a single cord around the projecting bundles or stacks of winding loops in a stator whereby the interlaced cord loops securely hold together the wires in said bundle or stack. These primary elements are; a stator holder which is periodically rotated through a predetermined arc; a hook needle of the knitting or crocheting type, which is reciprocated toward and from the stator, raised and lowered relatively to the stator and rotated clockwise and counterclockwise; and a threader which raises and lowers concurrently with the needle and is also rotated clockwise and counterclockwise through a predetermined arc at its upper and lower positions.

Figure 7:
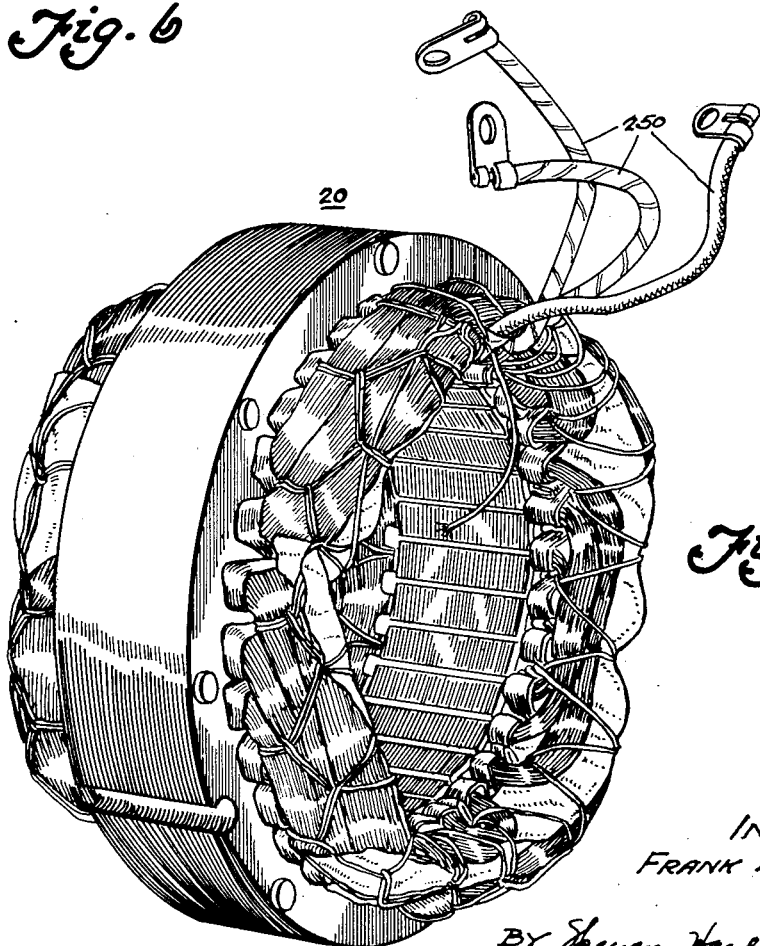
Fig. 7 is a perspective view of a stator completely laced by the present machine.

The stator 20 shown in Fig. 7, has been completely laced by the present machine. This stator has 32 slots and two sets of field windings concentrically arranged. The outer field winding comprises four groups of windings each group spanning eight stator slots. The inner field winding also comprises four groups of windings each group spanning eight stator slots each group, however, being at 45° relatively to the outer field winding groups. Insulating paper is placed between the inner and outer winding loops extending outside the stator body. Each slot is lined with insulation.

The stator holder of the machine is in the form of a turntable having four upright posts upon which the stator is placed. A core on the holder fits into the stator and has four projections which slide into respective slots of the stator properly locating it on the holder. Mechanism is provided in the machine which intermittently rotates the stator holder thereby presenting every other space between stator slots from which windings extend, for entry by the reciprocating hook needle during machine operation to lace a stator.

To understand more clearly the details of construction hereinafter set forth, it may be advantageous, at this time, generally to describe the functions of the machine during one cycle of operation in the lacing of a stator.

Figure 9:
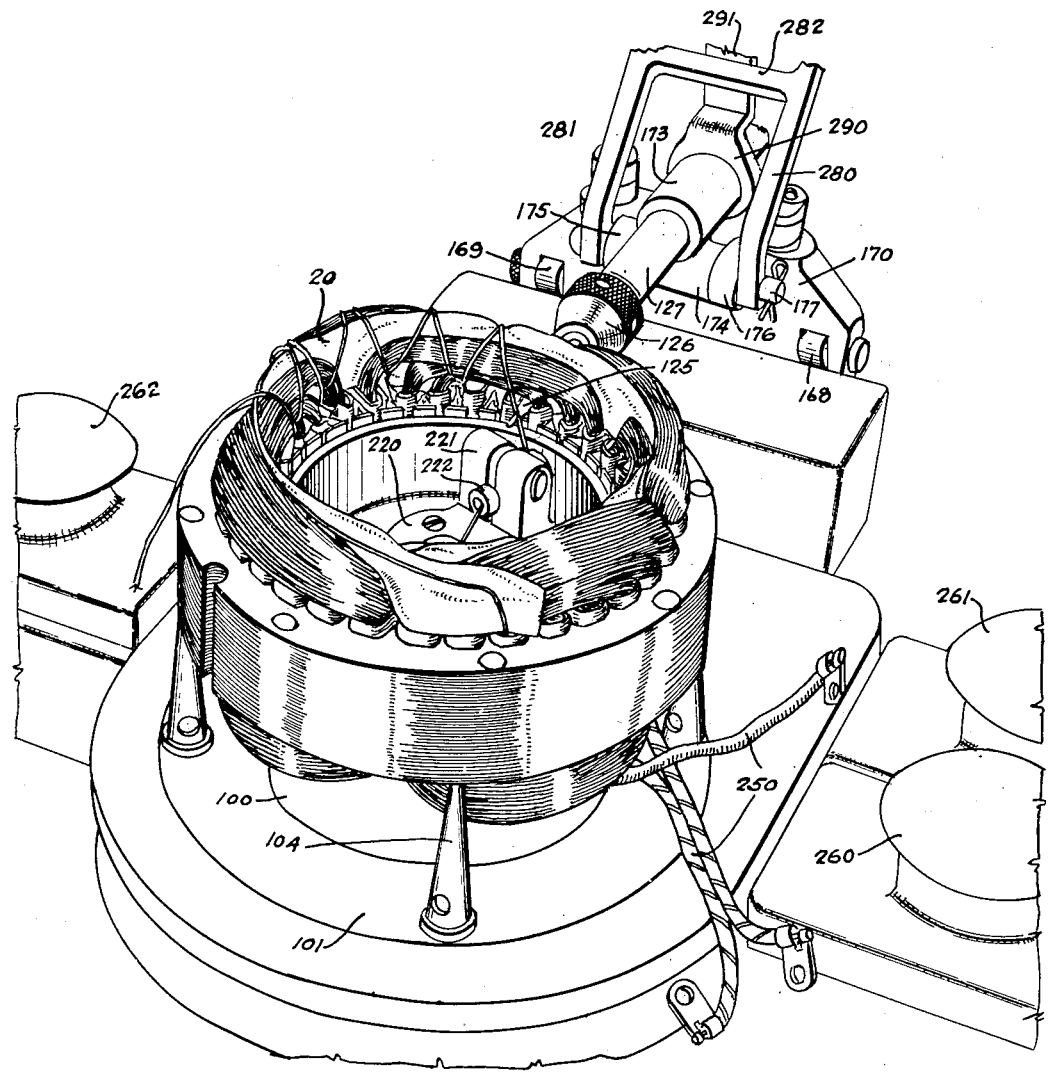
Fig. 9 is a perspective view of the machine showing the needle extending through a space between the windings into the interior of the stator and hooking the single cord preparatory to pulling the cord through the said space as the needle is retracted, thus forming a loop extending through a space between the windings of the stator.
Figure 10:
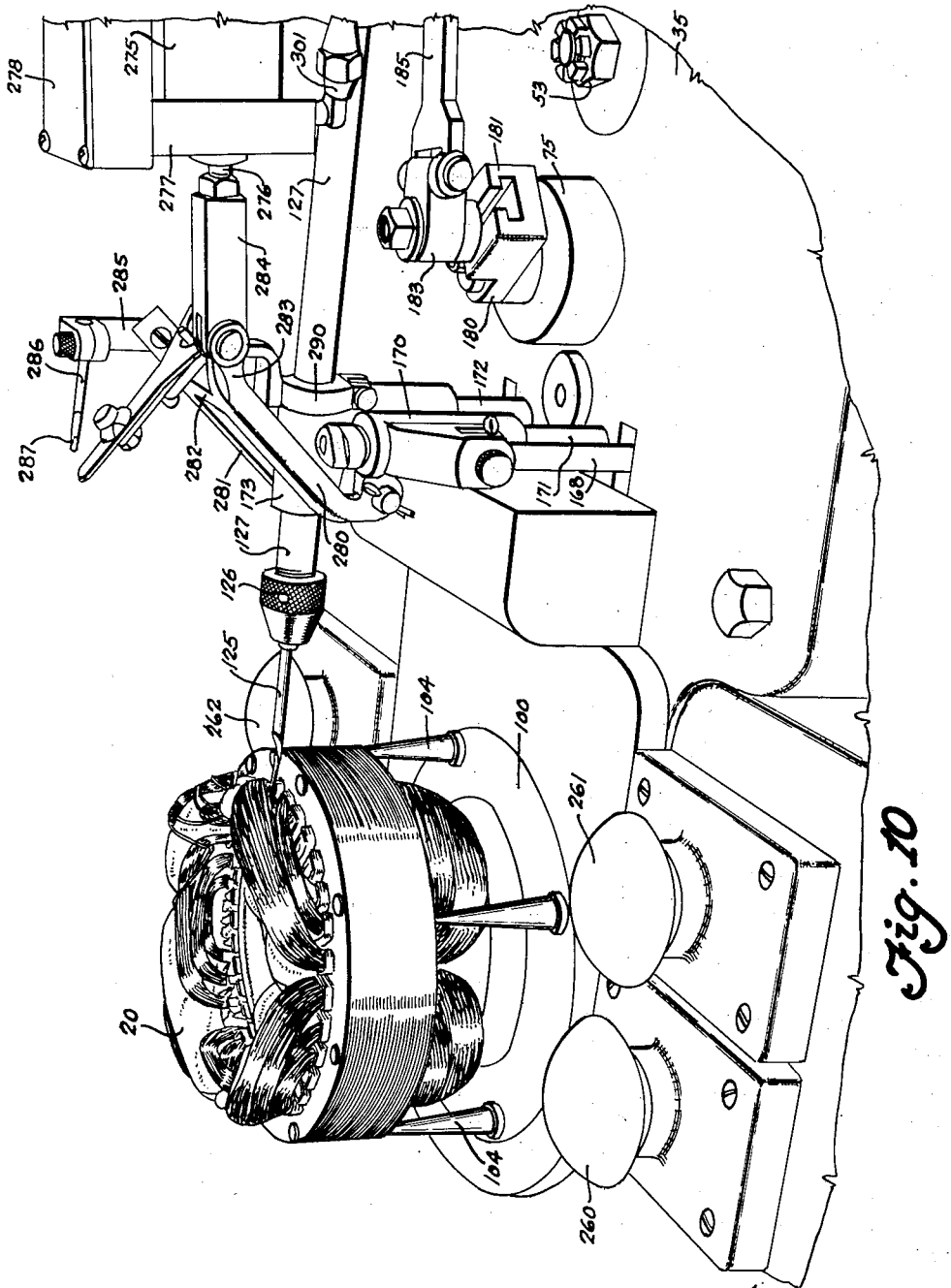
Fig. 10 is a perspective view showing the needle pulling the cord loop through the stator winding space toward the exterior of the stator.
Figure 11:
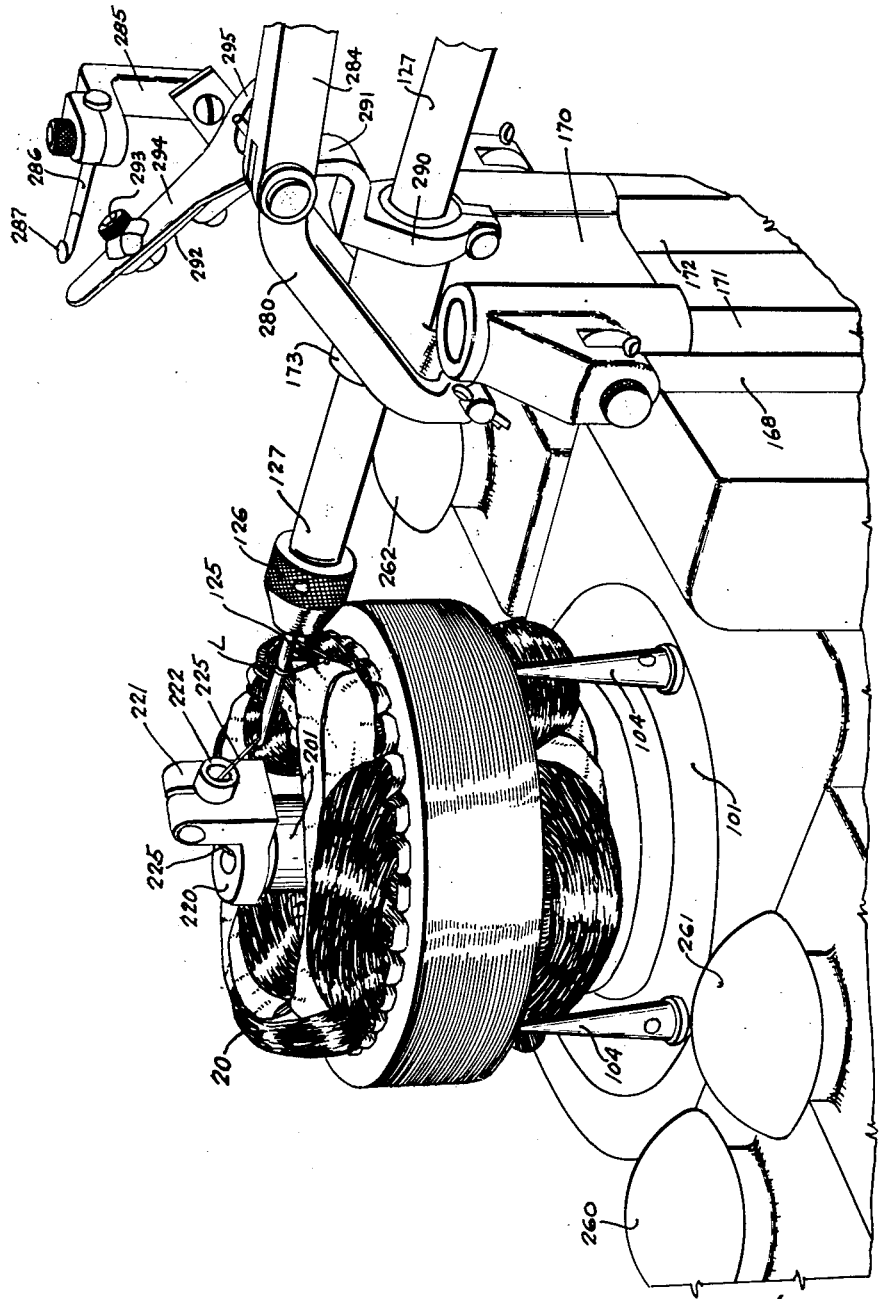
Fig. 11 is a perspective view showing the needle extending over the stator windings and engaging the single supply cord to draw it through the loop, now riding on the needle, when said needle moves on its retracting stroke and sheds said loop.

Starting with the needle extending through a space between adjacent stator windings into the interior of the stator and immediately above the stack of stator laminae, the hook needle, as shown in Fig. 9, will, upon its being retracted from the stator on its rearward reciprocation stroke, grasp the single cord extending from the threader and draw it, in the form of a loop, through said space to the exterior of the stator as shown in Fig. 10. After the needle is retracted sufficiently to clear the stator windings or more specifically, after said needle is completely out of the space between said windings, mechanism starts to raise the needle to a level above the stacked windings so that, when next it moves forwardly, the needle may pass over the windings. While the needle is moving upwardly and rearwardly, the stator carrier is indexed, that is, it is rotated through an arc of 11¼°. Before said indexing is completed the needle will have reached its extreme rearward or retracted position and will have started on its forward stroke toward the stator. Rotation of the stator during indexing tensions the loop carried by the needle, angularly on the stator windings. As the needle moves forwardly the loop thereon will slide on the needle, from its hook end toward its supported end, see Fig. 11. During this time the needle also turns so that its hook end will openly face the cord at the threader inside the stator, when the needle is again at its full extended position. See Fig. 11. Now the needle is again retracted or moved rearwardly, at which time it will again engage and hook the cord and pull it outwardly, in the form of a loop, over the windings stack. As the needle continues to move rearwardly the loop, riding thereon as shown in Fig. 11, will slide upon the needle toward the hook end thereof and finally will be shed by the needle at which time the cord loop, hooked thereby, will be drawn through the shed loop, see Fig. 12 thus forming interlaced loops around the windings stack. At this time also the stator holder is again rotated through an arc of 11¼° to bring the proper space between windings into alignment with the needle preparatory to its next forward stroke. After the needle reaches the position shown in Fig. 12, it starts to move downwardly as well as rearwardly and remains down until the needle has reached its full retracted position, has moved forwardly, penetrated the stator winding space, picked up the cord and has retracted sufficiently to clear the stator as aforedescribed. Sixteen such cycles completes full lacing of the stator after which the cord is severed and the starting and finishing ends thereof tied together to prevent ravelling. These operations may be followed sequentially on the operations chart Fig. 20 where the circle A indicates stator indexing, B needle movements up and down; C needle reciprocation, D needle rotation, E cord manipulation, F threader rotation, and G threader movement up and down, all at 15° intervals during the cycle.

Driving mechanism

Figure 1:
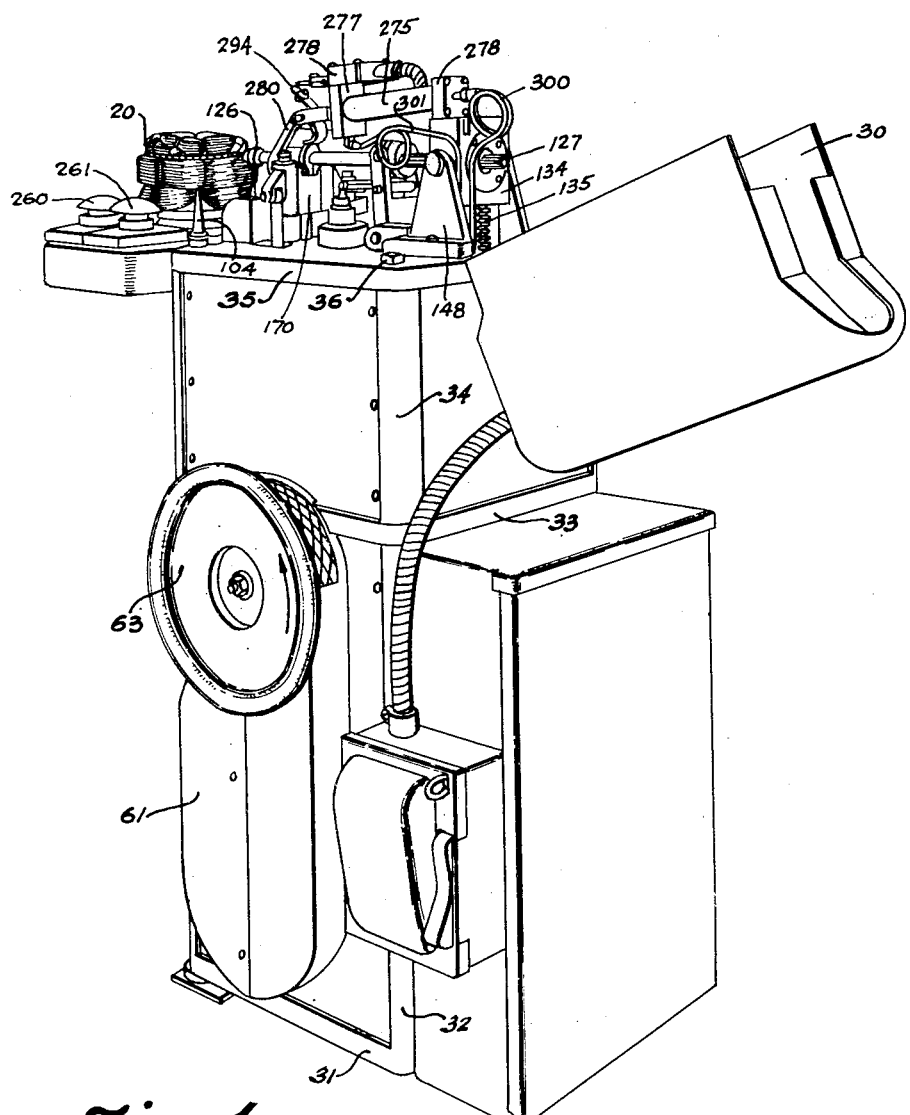
Fig. 1 is a perspective view of the stator or rotor lacing machine. The cover has been laid back to disclose the needle operating mechanism.

Fig. 1 shows the entire machine in perspective with the guard cover 30 thrown back to expose the upper mechanism. The machine comprises two main compartments one above the other. The lower compartment is formed by a base 31, upon which four corner posts 32 are provided, which support the intermediate plate 33. Four corner posts 34 are carried by plate 33 and support the upper platform 35 shown in plan view in Fig. 2. Posts 34 are secured to the upper platform 35 by bolts 36.

Figure 3:
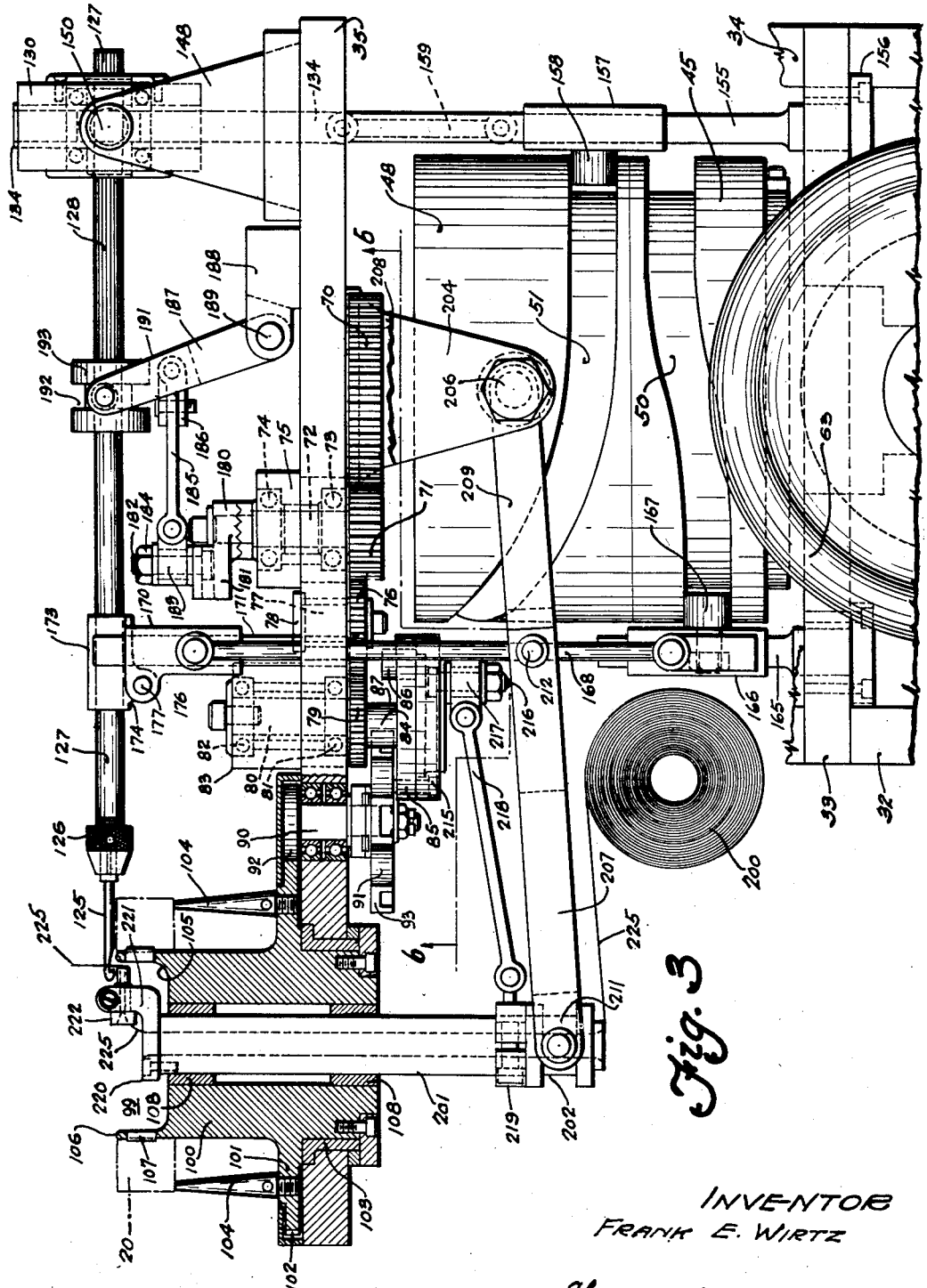
Fig. 3 is a fragmentary side view of the machine with cover removed, cams exposed and the cord supply spool shown. Certain parts are shown in section for the sake of clarity.
Figures 4, 5:
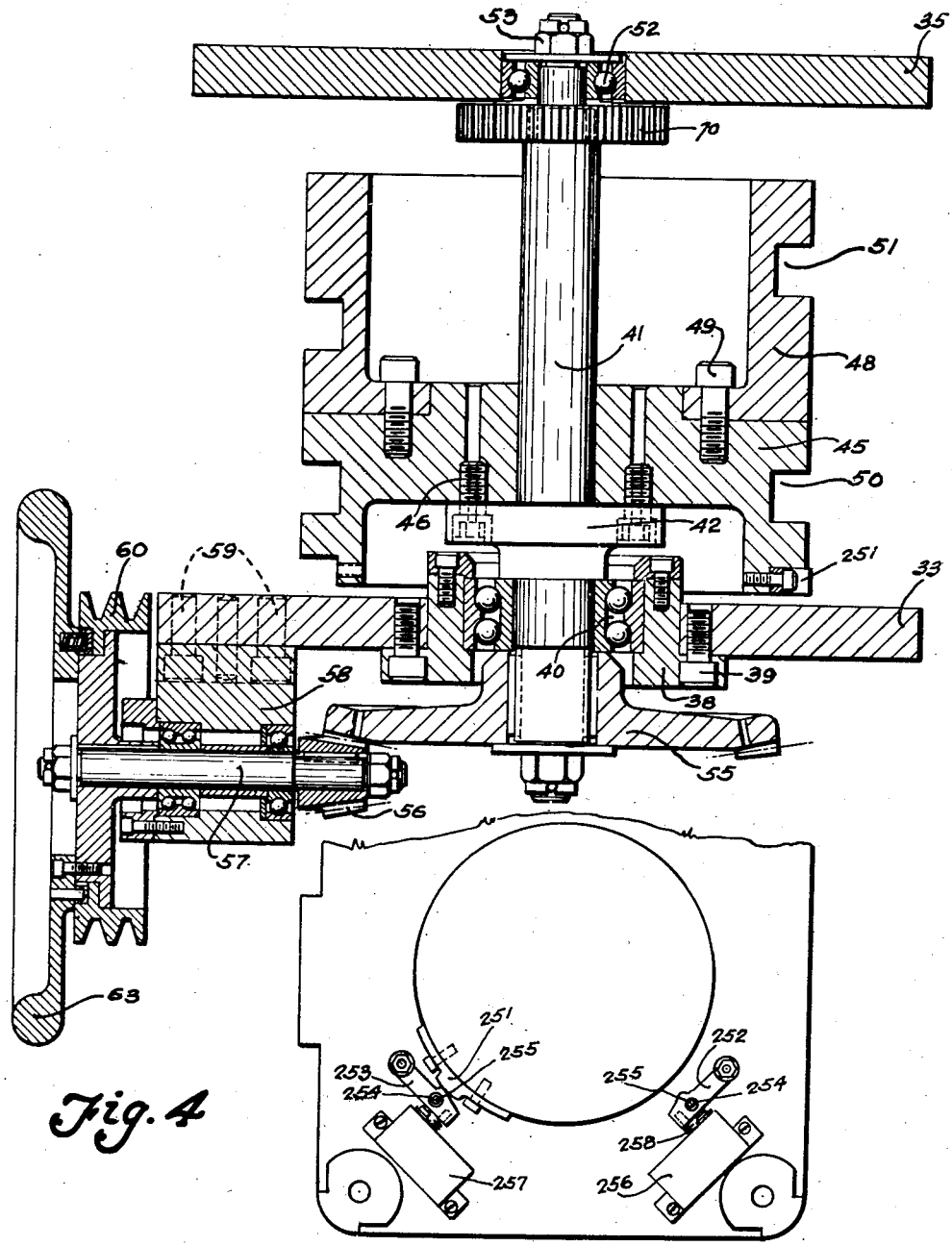
Fig. 4 is a fragmentary, part sectional view showing the driving mechanism of the machine.
Fig. 5 is a detail view of the timing switches on the machine.

As shown in Fig. 4, the upper compartment between the intermediate plate 33 and the upper platform 35 contains the twin cams which, as will be described, actuate mechanism to operate the lacing mechanism. A hole in the intermediate plate 33 receives a flanged collar 38 which is secured to said plate by bolts 39. Collar 38 supports the outer race of a ball bearing 40, the inner race of which is fitted upon and rotatably supports the cam shaft 41. A flange 42 is provided on said cam shaft. The lower cam 45 of the twin cam assembly has a central opening fitting about the cam shaft, said lower cam resting upon the flange 42 of the shaft and being secured thereto by bolts 46, thus cam 45 rotates with shaft 41. An annular extension on the lower cam 45, concentric with shaft 41, fits into an opening in the bottom of the barrel shaped, upper cam 48, when said cams are assembled. Bolts 49 secure the upper cam 48 to the lower cam 45 both of which are of the same outside diameter. Each cam has a particularly designed, annular groove in its peripheral surface, cam 45 having the groove 50 and cam 48 the groove 51. Fig. 3 is a side view of the twin cam 45—48 assembly and especially shows the relative curvature of their respective grooves 50 and 51. The chart of Fig. 16 shows a flat development of both grooves 50 and 51 of the respective cams 45 and 48.

Platform 35 has an opening in which a ball bearing assembly 52 is supported so as to be coaxial with the ball bearing 40 in the intermediate plate. Shaft 41 fits into the inner race of ball bearing 52. A lock nut 53 on shaft 41 maintains the shaft in proper position relative to the ball bearing 52.

The end of the shaft 41 extending beyond the inner race of ball bearing 40 and into the lower compartment beneath the intermediate plate 33, has a bevel gear 55 keyed to it. This bevel 55 meshes with a pinion 56 secured to a stub shaft 57 journalled in two ball bearings carried in the block 58 which is attached to the lower side of the plate 33 by bolts 59. The end of shaft 57 extending beyond block 58 has a grooved pulley 60 keyed thereto so as to rotate therewith, said pulley being operatively connected, by belts, with a main driving motor, not shown, but secured to the base 31 within the lower compartment. The belts, not shown, are covered by a housing 61 attached to the machine. A hand wheel 63 is attached to pulley 60, outside said housing 61 so as to be available to the operator if it is desired to turn the machine by hand.

*The stator carrier and its indexing mechanism*

Figure 6:
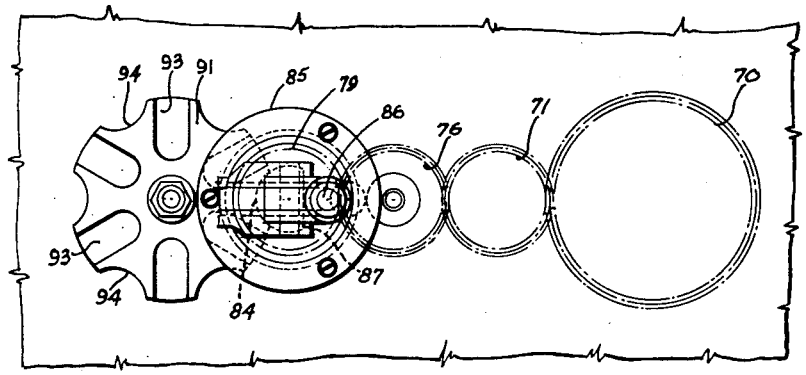
Fig. 6 is a detail view illustrating a part of the holder indexing mechanism. This view is taken along the line 6—6 of Fig. 3.

Within the upper compartment and directly beneath the platform 35, shaft 41 has a gear 70 attached thereto so as to be rotated thereby. Referring particularly to Figs. 3 and 6, gear 70 is shown meshing with gear 71 which is attached to one end of a stub shaft 72, journalled in two spaced ball bearings 73 and 74, the former being secured in a recess in platform 35, the latter, contained in a recess in the block 75 secured to the upper, outer side of said platform. An idler gear 76 meshes with gear 71, said idler gear being secured to a stub shaft 77 journalled in a bearing 78 carried by the platform 35. Idler gear 76 meshes with a gear 79 which is attached to a shaft 80 journalled in the two spaced ball bearings 81 and 82, the former housed in a recess in the platform 35, the latter in a recess in block 83 secured to the upper, outer side of said platform. A neck 84, coaxially attached to or being integral with gear 79 extends therefrom, said neck having the Geneva-gear driving disc 85 secured thereto or formed integral therewith in spaced relation so that said disc is coaxial with the neck 84 and gear 79. A pusher lug 86 extends from the side of disc 84 adjacent to but spaced from gear 79. The peripheral surface of neck 84 is not completely circular but has a flat side 87 formed in the peripheral surface thereof.

Gear 79 is twice as large as gear 71, thus gear 71 is rotated two complete revolutions for each one revolution of gear 70. Thus, for each single revolution of the twin cams 45 and 48, gear 71 will be rotated twice because gear 70 is attached to the same shaft 41 as said cams. Gears 76 and 79 are equal in size to the gear 71, thus they too will rotate two complete revolutions for each single revolution of gear 70 and the twin cams 45 and 48. The Geneva gear driver disc 85, being secured to or formed integral with gear 79 will also rotate twice completely for each revolution of said twin cams and gear 79 will also rotate twice completely for each revolution of said twin cams and gear 70.

A stub shaft 90, journalled in two ball bearings supported in the platform 35 has the Geneva gear 91 attached to its end extending into the compartment beneath the platform 35 and a gear 92 is attached to the opposite end of said shaft which extends above the platform. As shown in Fig. 6, the Geneva gear disc 91 has six equally spaced slots 93 extending radially inwardly from its peripheral edge. Between each two adjacent slots the peripheral surface of the Geneva gear disc 91 has an arcuate recess 94. These six arcuate recesses all have the same radii, equal to the radius of the circular surface portion of the neck 84 connecting the gear 79 and disc 85. As shown in Fig. 6, while one of these arcuate recesses embrace the neck 84, the Geneva gear disc 91 is locked against rotation, however, this does not prevent the neck from being rotated by the gear 79. As the gear 79 rotates the neck portion 84 and the driver disc 85, the circular portion of the neck is eventually rotated out of the embracing recess 94 of the Geneva gear disc and the flat side 87 of the neck is moved into juxtaposition with the Geneva gear disc. There will be a clearance between the flat side and the edge of the Geneva gear disc, thus the said disc is no more locked against movement but may be rotated. As the driver disc rotates the pusher lug 86 will approach and eventually enter the adjacent radial slot 93 after which the Geneva gear disc 91 will be rotated by said pusher lug until said lug 86 again moves out of the occupied slot. Now the circular portion of the neck 84 will again be embraced by an arcuate recess 94 to lock the Geneva gear disc against rotation while the driver disc 85 continues to rotate. Thus for each revolution of the driven disc 85, the Geneva gear disc 91 is rotated one sixth (⅙) of a revolution. Gear 79 integral with disc 85 rotates twice for each revolution of the twin cams 45 and 48, thus the Geneva gear disc will twice be rotated through one sixth (⅙) of a revolution while the cams rotate once and consequently gear 92 will likewise be actuated ⅙ of a revolution twice for each revolution of said cams.

The carrier upon which the stator is supported while it is being processed by the machine is in the form of a turntable 99 comprising a centrally apertured body portion 100 provided with an outwardly extending, annular flange 101, the peripheral edge of which is provided with gear teeth 102, meshing with the gear 92. A portion of body 100 beneath the flange 101 is journalled in a sleeve bearing 103 secured in an opening of the platform 35. Four posts 104 extend upwardly from the flange 101. The upper end of the body portion 100 has an annular recess 105 defined by a surrounding wall 106 in which four inserts 107 are secured in spaced relation so as to enter open ends of stator slots, properly to locate the stator when said stator is placed on the carrier to rest upon the four posts 104, as shown by the dot and dash lines in Fig. 3. Within the central aperture of the carrier portion 100 there are provided spaced sleeve bearings 108 which movably support a part of the threader to be described.

*The lacing needle*

The needle 125 used in the present machine is not of the ordinary kind in which the thread or cord extends through an eye therein and is constantly carried therein, but on the contrary needle 125 is of the crocheting or knitting type having a hook end which is adapted to engage and catch the thread or cord for pulling it to form interlocking loops. The shanks of the hook needle 125 is secured in a chuck 126 carried by a rod 127.

As has previously been stated, needle 125 has three distinct motions; first, it is rotated about 180° clockwise and counterclockwise, in order to place the open side of the hook end toward the cord so that the needle may hook or catch the cord and draw it when said needle moves on its retracting stroke; second, the needle moves up and down. In its up position Figs. 11 and 12, the needle may pass over the winding stacks in the stator as said needle is reciprocated and in its down position Figs. 9 and 10, the needle clears and passes directly over the stack of laminae of the stator and also passes through a space between windings in adjacent stator slots as said needle is reciprocated; third, said needle and its rod 127 is reciprocated, forward Figs. 9 and 11, to pass over or through the stator and rearward Figs. 10 and 12, to draw a cord loop over or through the stator.

Needle rotation

Figure 2:
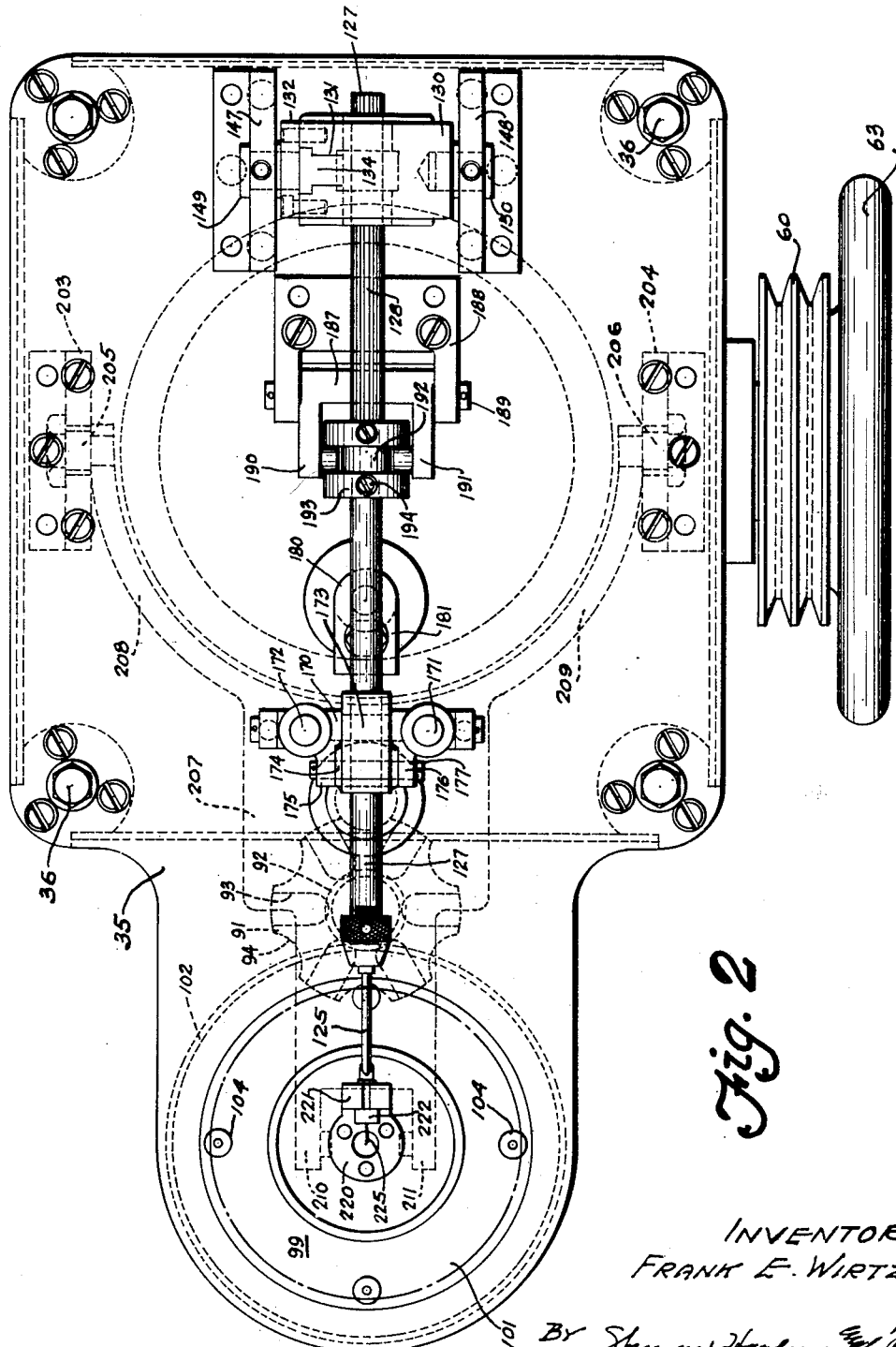
Fig. 2 is a plan view of the machine with cover removed.

For the following description reference may be made to Figs. 1, 2, 3, 15, 17, 18 and 19, especially Figs. 17, 18 and 19 which detailedly show the mechanism providing for a rotating, raising and lowering and a reciprocating needle shaft. As shown in Fig. 2 the needle rod 127 is splined for a portion of its length at the end opposite the chuck 126. This splined portion comprises equally spaced, longitudinal grooves 128 in its peripheral surface. Splined portion of rod 127 extends coaxially through an opening 129 in block 130, said opening being larger in diameter than the rod. One edge of this block 130 has a rectangular, longitudinal recess 131 throughout its entire length, the outer portion thereof being wider and shallower than the inner portion. A plate 132 is secured to this one edge of block 130 by screws 133, thereby closing the recess and making it an open ended channel in which the rack 134 is slidably supported. The teeth 135 on the rack are exposed in the transverse opening 129 in the block 130.

The splined needle shaft or rod 127 is supported in a pinion 136, the central opening in which is interiorly splined to fit upon said rod so that the rod and pinion must rotate together while permitting the rod to slide in the pinion. Pinion 136 has a central toothed portion 137 of larger diameter than the two hub portions 138 and 139 which extend coaxially from opposite sides of the central portion. Two ball bearing assemblies 140 and 141 fit into the opening 129 in block 130 the inner race of bearing 140 fitting over and supporting the hub 138 of pinion 136 and the inner race of bearing 141 fitting over and supporting the hub 139 of said pinion. Centrally apertured cover caps 142 and 143 are secured on opposite sides of block 130 each cover cap having an annular extension on its inner face, fitting into opening 129 in block 130 and engaging the outer race of the adjacent ball bearing. The inner races of said ball bearings are engaged by the respective sides of the toothed portion 137 of the pinion 136 and hold the pinion in proper position in block 130 as shown in Fig. 18.

Figure 8:
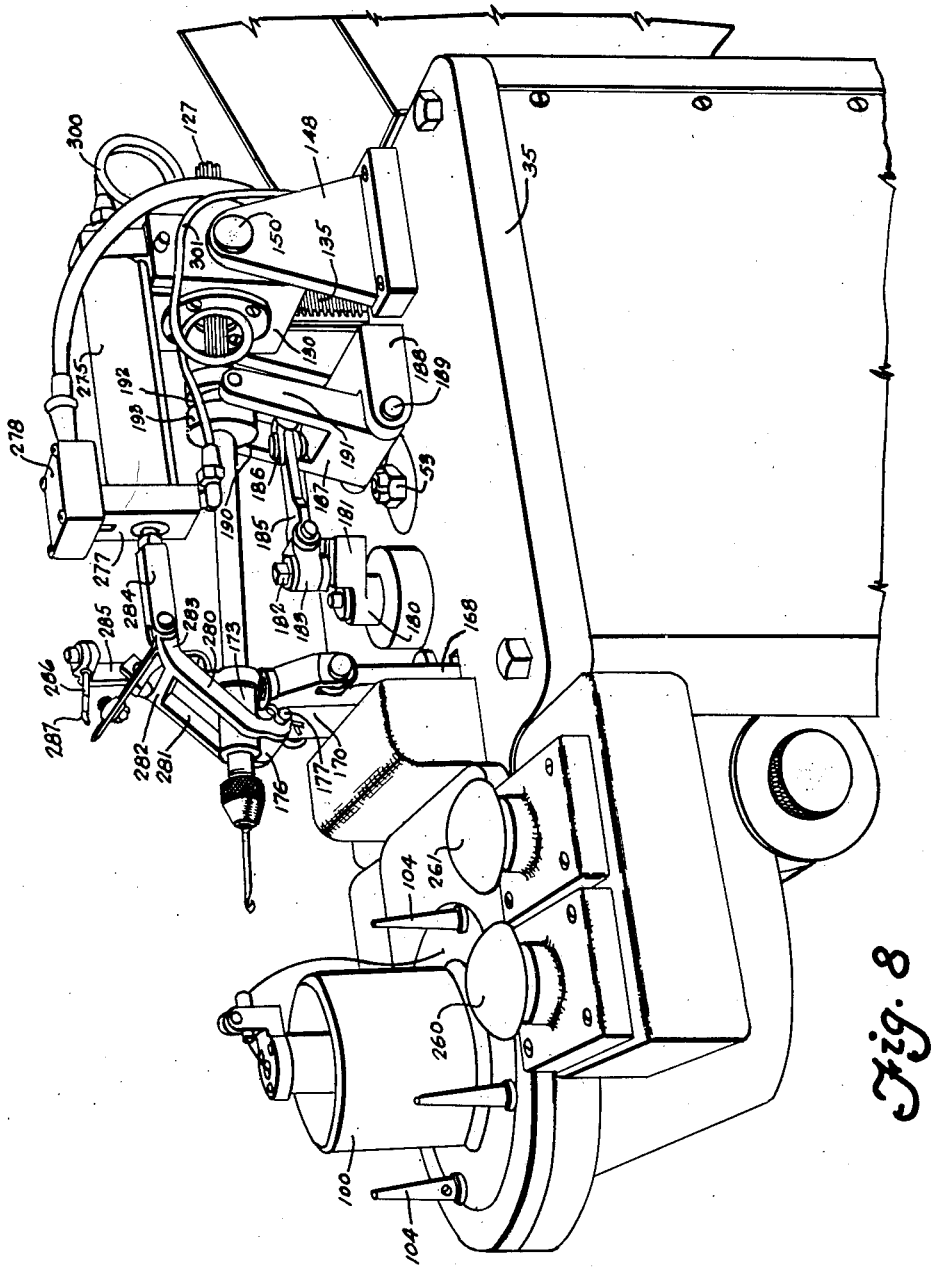
Fig. 8 is a perspective view of the needle mechanism shown in Fig. 3.

Block 130 provides the pivotal fulcrum supporting the needle rod or shaft 127 so that raising and lowering of the needle is made possible. Block 130 has an opening 145 in its one side, while plate 132, attached to the opposite side of the block, has a similar opening 146 coaxial with opening 145. It will be seen in Figs. 17 and 18, that the center line of openings 145 and 146 intersects the center line or axis of the pinion 136. Figs. 2, 3 and 8 show the platform 35 of the machine having two oppositely disposed stanchions 147 and 148 mounted thereon. Each stanchion has an opening at its top end, both openings being concentric. A pivot pin 149 in the opening of stanchion 147, extends into the opening 146 of the plate 132 secured to block 130 and a similar pivot pin 150 in the opening of stanchion 148, extends into the opening 145 of said block. Thus block 130 is pivotally supported upon pins 149 and 150 of the respective stanchions 147 and 148 so that said block may rock to permit raising and lowering of the needle shaft about the axis forming the center of pins 149 and 150.

Two spaced parallel posts 155 are secured between the intermediate plate 33 and the platform 35. Each post has a flanged end 156 secured to the bottom of the intermediate plate 33 by screws. Between them these posts 155 slidably carry a block 157 which has a lug 158 extending therefrom into the groove 51 of the upper cam 48. As the cam 48 rotates, block 157 with its cam follower lug 158 is slid up and down on the posts 155. A link 159 has one end hingedly attached to block 157 and the other end to the rack bar 134, so that the rack bar 134 is moved up and down with the cam follower 158. The hinged link 159 is necessary to permit rocking of the block 130 about the axis of its supporting pins 149 and 150 as the needle rod or shaft is raised and lowered, as well as the concurrent sliding of the rack bar 134 in block 130 in response to the straight up and down movement of the cam follower block 157 on the two vertical and parallel posts 155. This mechanism for rotating the needle shaft or rod 127 is designed and constructed to turn said shaft clockwise, as viewed from the needle end, through approximately 180° as the rack bar 134 is moved through its upward stroke by cam 48 and counterclockwise the same degree as the rack bar moves through its downward stroke. One revolution of cam 48 moves the rack bar up and down, thus the needle rod or shaft is rotated in one direction and the other, approximately one-half revolution for each revolution of the twin cams 45 and 48.

Needle shaft raising and lowering mechanism

Cam 45 actuates the needle shaft 127 up and down about the axis of pins 149—150 supporting the fulcrum block 130. The cam 45 is operatively connected to the needle shaft 127 by mechanism comprising, a pair of spaced, parallel posts 165 secured to the intermediate plate 33 and extending vertically therefrom toward the upper platform 35, see Fig. 3. A saddle block 166 has two parallel passages, spaced to fit upon said parallel posts whereby said saddle block is slidably carried by said posts. This saddle block 166 has a cam follower lug 167 extending therefrom into the groove 50 of the cam 45 whereby, in response to rotation of said cam, the saddle block is slidably moved up and down on posts 165. Two links 168 and 169, extending slidably through openings in the upper platform 35, are hingedly secured at one end, to the saddle block 166, one link on one side of said block and the other link on the opposite side thereof. The other ends of these two links are similarly hinged to opposite sides of a saddle block 170 which is slidably carried by the vertical posts 171 and 172, rigidly secured to the top of the platform 35 (see Figs. 3 and 14). A collar 173 slidably fits about the needle shaft 127, said collar having a projecting lug 174 which is pivotally secured to and between two spaced ears 175 and 176 on the saddle block 170 by a pin 177. By means of the mechanism described in this paragraph, the cam 45 during one complete revolution will raise and lower the needle shaft 127 which, as has been stated, is supported by block 130 fulcrumed on the pins 149 and 150.

Mechanism for reciprocating the needle and shaft

As heretofore described, the gear 70 is attached to the drive shaft 41 to which the twin cams 45 and 48 are also secured, thus gear 70 rotates at the same speed as said cams. Gear 71 secured to stub shaft 72, meshing with gear 70, which is twice the size of gear 71, thus makes two revolutions for each single revolution of gear 70 or cams 45 and 48. On the portion of the stub shaft 72 extending beyond the block 75, there is attached the hub portion of a rotor 180 having an arm 181 extending radially therefrom. In the upper surface of said radial arm there is provided an undercut, longitudinal slot into which the head of a bolt 182 slidably fits. A collar 183 fits over this bolt and a nut 184 on the bolt locks said bolt and collar in any adjusted position longitudinally of the radial arm 181 so that said bolt is maintained in the selected eccentricity relatively to the axis of the stub shaft 72. Collar 183 has an ear extending from its annular wall to which the forked end of a lever or link 185 is hingedly secured. The other end of link 185 is pivotally secured to a member 186 so as to be movable in a horizontal plane relatively thereto. This member 186 is hinged to the forked portion of lever 187 one end of said lever being pivotally anchored to the block 188 by a pin 189. The two prongs 190 and 191 of the member 186 each have an inwardly extending lug adjacent the outer end, said lugs projecting into the annular groove 192 in the collar 193 adjustably secured to the needle shaft 127 by the set screws 194.

Rotation of the eccentric arm 181 of member 180 causes the link 185 to rock the lever 187 back and forth on pivot pin 189 thereby resulting in a reciprocation of the needle shaft 127. The amount of reciprocal travel of said shaft 127 may be varied by adjusting the position of the stud 182 relatively to the stub shaft 72. Adjustment of the collar 193 on shaft 127, shifts the range of needle reciprocation relatively to the axis of the stator carrier 99.

Inasmuch as the eccentric 181 makes two revolutions for each single revolution of cams 45 and 48, inasmuch as cam 45 causes the needle shaft 127 to be raised and lowered once for each cam revolution, it may readily be seen that when the needle is up, it is reciprocated out and back as well as when the needle is in its lower position. Specifically the arrangement of the groove 50 in cam 45 is such that the needle shaft remains at rest for a while in its upper and also in its lowermost positions. During these rest periods the needle shaft is completing a certain range of its forward reciprocation and then passing through a similar range of its rearward reciprocation at both, upper and lower positions of the needle shaft respectively. This assures that the needle is away from and clears the stator in the carrier 99, when said needle is being raised or lowered, thereby avoiding damage to the stator and to the needle.

*The needle threader and its operating mechanism*

This machine is adapted to lace cord about the winding stacks in a stator to bind them securely together. The cord is taken from a supply spool 200 supported in any suitable manner on the machine and provided with means for placing a satisfactory tension on the cord when being drawn from the spool.

The cord must be placed in proper juxtaposition to the needle 125 when it is at its fully extended or in its out positions both up and down, so that the hook end of the needle can catch or hook the cord as said needle moves on its retracting or return stroke. A threader or guide is provided for this purpose said threader comprising a tubular member 201 rotatably and slidably supported in the sleeve bearings 108 within the central passage of the core or body 100 of the stator carrier 99. At its lower end, member 201 has an enlarged annular head provided with a circumferential groove 202.

Referring to Figs. 2 and 3, the platform 35 is shown having two depending brackets 203 and 204, oppositely disposed and adjacent the longer sides of said platform. Each bracket has a pivot pin 205 and 206 respectively, both in coaxial alignment, the center line of which intersects the axis of cams 45 and 48 as shown in Fig. 3. An actuating lever 207 has a bifurcated end comprising oppositely disposed, circularly shaped prongs 208 and 209, the former pivotally supported on the pin 205, the latter on pin 206. The other end of lever 207 is also forked, the prongs 210 and 211 having inwardly extending lugs which project into the peripheral groove 202 of the tubular member 201 and mechanically connect lever 207 with said member. Means 212 hingedly connects lever 207 with the two links 168 and 169 so that as the cam 45 moves the saddle block 166 and its attached links 168 and 169 upwardly and downwardly, the lever 207 will likewise be moved about its pivotal supports 205 and 206 moving the tubular member 201, attached to said lever 207, upwardly and downwardly in bearings 108.

As has previously been stated, tubular member 201 is not only raised and lowered axially, but it is also rotated back and forth through an arc of approximately 180°. The mechanism to rotate member 201 comprises a disc 215 attached to the lower side of the Geneva-gear driver disc 85 in any suitable manner. Disc 215 has a diametral key way in its outer surface in which a headed bolt 216 is adjustably secured by the tightening of the nut on said bolt. A collar 217 is rotatably carried on bolt 216, said collar having an ear extending from its annular edge to which one end of a link 218 is pivotally attached. The bolt 216, as shown in Fig. 3, is secured to the disc 215 so as to be eccentric relatively thereto. The other end of link 218 is pivotally attached to an ear on the collar 219 which encircles the tubular member 201 and is adjustably secured thereto. Rotation of disc 215 with the driver 85 will rotate the eccentric bolt 216 about the center of said disc, the link 218 thereby being moved longitudinally to cause rotation back and forth of the collar 219 and the tube 201 attached thereto.

The end of tubular member 201 extending beyond the bottom wall of recess 105 in the stator holder 100, has a disc 220 secured thereto in any suitable manner, said disc having an upright extension 221 in which the threader sleeve 222 is secured so as to be radial of the tubular member 201. This threader sleeve is adjustable radially relatively to the axis of said tube 201. The cord 225 from the supply spool 200 extends upwardly through the tube 201 and then through the radial threader sleeve 222.

Fig. 3 shows the threader sleeve 222 beneath the needle 125 when said needle is in its lowermost position and ready to move on its return or retracting stroke. In Fig. 11, the needle is shown in its upper positions, over the stator windings and the threader sleeve positioned above the needle. These positions of the threader sleeve beneath and above the needle are necessary in order that said sleeve may position the cord 225 in the path of needle movement so that the hook end of the rearwardly moving needle may catch or hook said cord and draw it outwardly of the stator to form a loop.

The saddle block 166 and its cam follower 167 is moved upwardly and downwardly by cam 45. Links 168 and 169, attached to the saddle block 166, will move a similar saddle block 170, attached to the needle rod 127, upwardly and downwardly said rod being supported at one end in the pivoted block 130. Fulcrum pins 149 and 150 pivotally support block 130. The saddle block 170 is attached to needle rod 127 at a point closer to the needle than to the fulcrumed block 130 so that the needle 125 is raised and lowered a predetermined distance.

Lever 207 fulcrumed on pins 205 and 206 with its free end connected to the tubular member 201, is also operatively attached to links 168 and 169 and therefore is moved upwardly and downwardly about its pivoted support by said links. These links 168, however, are attached to lever 207 at points closer to the fulcrum point than to the tubular member 201, so that the same links 168 and 169 move said tubular member through a predeterminately greater range up and down than they move the needle 125. These connections are so arranged that when the needle is down the threader sleeve 222 is beneath the needle, and due to the longer range of movement of the said threader sleeve, it will be above the needle when said needle is at its uppermost position.

From the aforegoing description it will be seen that cord 225 is placed in proper position relatively to the hook end of the needle 125 so that as said needle moves rearwardly on its retracting stroke the said hook end may catch or hook the cord to draw it outwardly of the stator and form a loop. The cord 225 is placed beneath the needle when it is in its lower position and likewise the cord, by rotation of the threader sleeve 222 is placed on the open hook side of the needle when said needle is rotated by the rack bar in one direction and in the same relative position with the needle when said needle is rotated into the opposite position diametrically.

*Machine timing mechanism*

Any suitable mechanism may be provided to permit the operator to start machine operation after the stator has been placed on the carrier and to so time the machine that after a predetermined number of cycles have been completed, the machine will automatically stop.

According to the present machine, if a stator having 32 slots is to be laced, the needle will reciprocate forward and rearward 16 times beneath and 16 above the winding stacks to form the desired number of binding loops about the protruding stacks of windings, said loops each extending beneath a stack between alternate stator slots. Some stators require the said 16 needle cycles to finish one end while only 14 such needle cycles are necessary to finish the other end due to the provision of connector leads 250 see Fig. 7.

Any suitable control mechanism for limiting and timing machine operation may be used. In the present machine cam 45 has a contact block 251 attached to its peripheral edge as shown in Figs. 4 and 5. Two switch actuating arms 252 and 253 are pivotally supported on the intermediate plate 33 so as to be properly spaced one relatively to the other. Each arm has an opening 254 through which a smaller diameter post 255, secured to plate 33, extends. This post limits pivotal movement of its respective arm in either direction. Each arm is adapted to be engaged and moved by the contact block 251 on cam 45. A switch 256 is actuated to open position each time block 251 engages and moves arm 252 against the effect of a spring 257 which normally urges the arm 252 into the path of movement of the block 251. Likewise switch 257 is adapted to be actuated into circuit opening position when arm 253 is engaged and moved by the block 251.

Two separate sets of counters (not illustrated) are provided in this machine said counters being of any standard make purchasable on the open market. One counter is operative to limit machine operation for a 16 double stitch operation, the other for a 14 double stitch operation, as above referred to.

Two button switches 260 and 261 are provided on the machine, 260 for the 16 double stitch cycle and 261 for the 14 double stitch cycle. Depressing switch 260 closes a circuit breaker which starts the machine by completing the electrical circuit through a relay associated with the 16 double stitch counter mechanism. Each time the cam 45 rotates its contact block 251 will open the switch 256, however, the counter mechanism will not permit the relay associated therewith to open until said counter has permitted the machine to complete 16 double stitch cycles after which the counter is effective to open its relay. For each revolution of cam 45 the contact block thereon will also open switch 257. As long as the 14 stitch counter is effective to hold its relay closed due to the previous closing of switch 261, opening of switch 257 will not affect the circuit breaker to stop the machine. However, when said counter has permitted the machine to complete its 14 double stitches and then opened its relay, the next following opening of switch 257 by the cam block 251 will open the circuit breaker to discontinue the complete circuit, causing the machine to stop. To have the machine operate for the 14 double stitch operation, the attendant depresses the button 261 which connects the 14 stitch counter mechanism and its relay in the electrical circuit. A button 262 may be pressed to open the main circuit and to stop the machine at any time. Thus the machine operation is definitely timed in accordance with the number of revolutions of the cam 45, the timing being selected by rendering various sets of counters effective, one set for each desired number of machine cycles.

*Cord severing mechanism*

When the main circuit breaker, closed by the depression of either button 260 or 261 is finally opened at the finish of a machine operation as aforedescribed, said circuit breaker is adapted to close a circuit through a solenoid valve (not shown) for actuating said valve to permit hydraulic medium to flow through pipe 300, into one end of a cylinder 275 for actuating the piston and its rod 276 forward in said cylinder (see Figs. 8, 13 and 15). This cylinder has a head member 277 at its forward end which contains mechanism engageable by the piston in the cylinder to close a switch 278 carried by said head member. Closing of switch 278 renders another valve (not shown) effective to direct hydraulic medium through pipe 301, into the front end of the cylinder for returning the piston to its normal rearward position in said cylinder, see Figs. 8 and 10. The cylinder 275 is carried by the fulcrum block 130 and moves up and down with the needle rod 127, so that the center line of the cylinder 275 is constantly parallel with the center line of the said rod 127.

Figure 12:
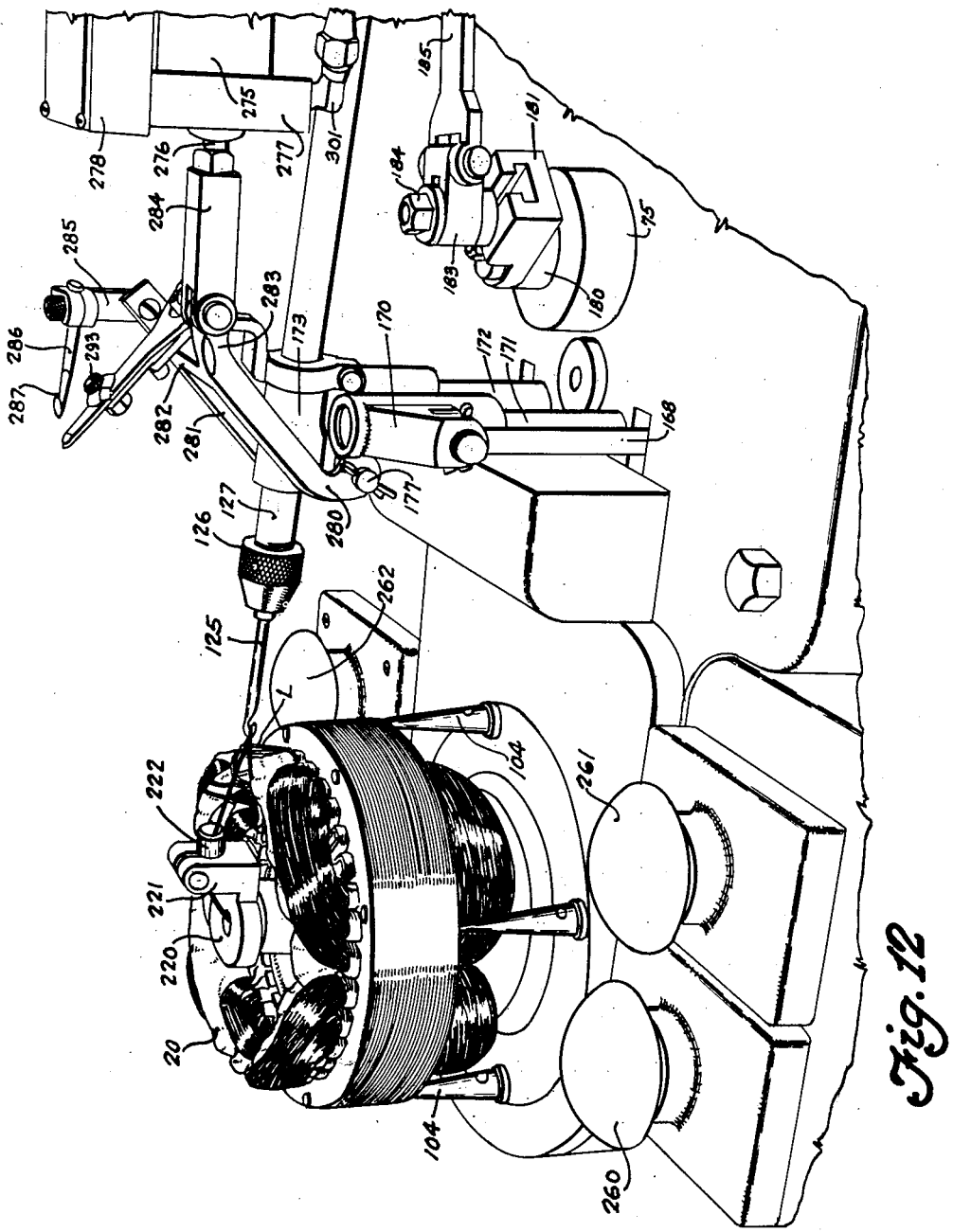
Fig. 12 shows the needle retracted and the loop, shed by the needle, having the hooked cord extending therethrough.

The projecting lug 174 on saddle block 170 which raises and lowers the needle rod 127, has a pin 177 to which the fork arms 280 and 281 of a rocker lever 282 are pivotally attached. (See Figs. 8, 9 and 13.) At the upper corner of lever 282, opposite the pivot of forked arm 280, an ear 283 has a link 284 pivoted thereto which link is secured to piston rod 276 forming a longitudinally adjustable extension thereon. An extension of lever arm 281 has a bracket 285 secured thereto, which adjustably supports a rod 286 having a hook end 287. When the piston in cylinder 275 is in its normal position at the rear end of the cylinder, link 284, connected to the piston rod 276 and lever 282, attached to said link and bracket 285 on lever 282, will be in the position as shown in Figs. 10, 12 and 14. However, after the machine has completed all its cycles as determined by the particular counter in effect, and following the stopping of the machine, the piston in cylinder 275 will be moved from its normal rear position into its forward position in said cylinder. The forward movement of the piston rod 276 will actuate the lever 282 into the position as shown in Fig. 13. Now the hook end 287 of the rod 286 will hook or catch the cord forming the loop between the hook end of needle 125 and the stator. This strand is the cord 225 (see Fig. 12) which passes through the threader 221 and tube 201 to the source of supply or roll 200. As soon as the piston in the cylinder 275 strikes and actuates the switch operating mechanism in the cylinder head 277 to render the switch 278 effective for operating a valve pressure medium is directed into the front end of the cylinder via the pipe 301, Fig. 8, causing the piston to return to its normal rear position thus moving lever 282 into its normal up position as in Fig. 14. The hooked rod 286, as it moves upwardly draws the cord 225 with it, elongating the loop as shown in Fig. 14. One portion of the cord is drawn between the blades of a scissors mechanism which, when the lever 282 moves into its normal position severs the cord, freeing the stator from the cord supply and leaving an end which may be tied to the starting end of the cord to prevent unravelling of the bindings around the wire stacks.

A collar 290 encircles the barrel portion 173 of the saddle block 170 which slidably carries the needle rod 127, said collar being adjustably secured to said block 170. Collar 290 has an angular extension 291 which forms the stationary shear-blade 292 of the scissors. A stud 293 on said shear-blade 292, has the movable shear blade 294 pivotally mounted thereon. Shear blade 294 has an angular arm 295 extending therefrom which is engageable by the portion of lever 282 carrying the bracket 285 for actuating the movable shear blade 294 to cooperate with the stationary shear blade 292 and sever the cord when lever 282 is returned to normal position by the piston rod 276. A spring 296 acts on shear blade 294 normally to keep it in position relatively to the stationary shear blade 294 so that the shearing ends of both blades are yieldably maintained apart, whereby hook 287 can move the cord therebetween when it lifts said cord as the lever 282 is being returned to normal position by the piston rod 276. Engagement of lever 282 with the angular arm 295 of the movable shear-blade actuates it to sever the cord between it and blade 292.

*Operation of machine*

To lace or bind the protruding winding loops of a 32 slot stator at the end thereof opposite that from which leads 250 extend, the attendant places the stator on the stator holder 99 so that the four inserts 107 on the rim 106 of the holder extend into four slots of the stator and the stator lamination stack rests upon the four upright posts 104 as shown in Fig. 3. The attendant then grasps the cord 225 vertically and depresses button 260. This causes the main circuit breaker to close and connects the 32 slot counter and its relay, as well as switches 256 and 257 in the electrical circuit causing the electric motor, which is connected by belt with the driven pulley 60, to run and drive the machine. Cams 45 and 48 and gear 70 will now rotate and for one revolution of said cam and gear, the various elements of the machine will successively function as disclosed by the operations chart Fig. 20 which indicates the status of the stator carrier, the needle and the threader for each 15° revolution during a single full revolution of said cams and gear.

When a stator is to be placed on the machine, the needle 225 is substantially at its rearward position. As the machine starts to operate, the eccentric 181, connected to the shifter collar 193 on the needle shaft or rod 127 moves the needle forwardly so that, in its down position, the needle enters between windings extending from adjacent slots and protrudes into the interior of the stator (Fig. 9). In describing one cycle of the machine and starting at the vertical line marked O on chart Fig. 20 it will be seen on circle C that the needle 125 is in its foremost position in which its hook end extends within the stator, also shown in Fig. 3. At this point the needle 125 is being rotated by the gear track 134 actuated in turn by cam 48, so that the open hook of the needle 125 will be toward the cord 225. As the cams 45 and 48 rotate through the first 30° the needle is moving rearwardly and turning slowly. At the 30° line of cam rotation the needle catches or hooks the cord which at the start is being held upright by the attendant, see circle E on chart. At 35°, the threader, which has previously been turned toward the needle for cord catching purposes, is being turned from the needle. At 45° the needle, which by now has been retracted from the stator sufficiently to clear it, starts to move upwardly under the effect of links 168—169 and saddle block 166 actuated by cam 45, see circle B. The threader 222 moves up also being actuated by the same links 168—169. While retracting, the needle, now hooking the cord, is drawing a loop through the space between windings. See Fig. 10. At the 75° line, while the needle is raising and approaching its rearmost position, the gear mechanism including gears 70, 71, 76, 79, Geneva gear driver 85, Geneva gear 91, pinion 92 and toothed flange 101 of the stator holder rotates the said holder 11 and ¼° or one-half the total rotation of a complete index of the stator holder. This partial indexing is completed at the 105° line see circle A. At the 90° radial line of the chart the needle has reached its rearmost position and while still moving up, starts to move forwardly toward the stator. The turning of the stator holder has caused the loop held by the needle to assume a biased position relatively to the stator. As said needle is moving forwardly and upwardly to clear the stator windings the loop L of cord hooked by the needle will slide rearwardly over the shank of the needle 125, see Fig. 11. At the 120° line, circle F, the threader turns to approach the needle while said needle is moving forwardly to pass over the stator windings as shown in Fig. 11.

At the 135° line of cam rotation, the needle and threader are completely up. At 170° line the needle starts to turn so that its hook is open to the cord in the threader. At 180° the needle has reached its foremost position and starts to move rearwardly see circle C. At the 210° line the hook of the rearwardly moving needle grabs the cord 225 at the threader (Fig. 11) and draws a loop rearwardly over the windings of the stator. The loop L on the needle shank slides over the rearwardly moving needle and when said needle sheds this loop L at 245° the new, hooked loop is drawn through the shed loop as shown in Fig. 12. At the 225° line the needle will have reached its uppermost position and the threader 222 starts to move down as the needle starts to move down. At 255° the rearwardly and downwardly moving needle will have cleared the stator so that its second indexing rotation of 11 and ¼° may be started, which is completed at 285°. At 285° the needle stops turning. At 300°, threader 222 rotates toward the needle path. At 315° the needle is completely down and also the threader. Here the needle starts to move upwardly while moving forward and at 360° or zero start a new cycle, as aforedescribed begins. These cycles are continued until the counter opens its relay and when the cam block 251 opens switch 257 thereafter, the main circuit breaker is then opened and the circuit to the main driving motor is discontinued stopping the machine. Before this, however, the counter will have actuated a relay to operate a solenoid valve for directing hydraulic medium through pipe 300 to cylinder 275 shifting the hook 287 to grasp the cord in the final loop as shown in Fig. 13.

When the piston in cylinder 275 reaches its foremost position it actuates the mechanism in head 277 to close switch 278 which energizes another solenoid valve to direct hydraulic medium through pipe 301 into the cylinder for returning the piston to its rear position and thereby lift the hooked rod 286 to normal as shown in Fig. 14. In returning to normal, hook rod 286 moves the cord between the scissors blades 292—294, the latter being actuated by the return of bracket 282 to normal, to sever the cord 225. The severed end of the cord on the stator is tied by the attendant, to the starting end of the cord thereby preventing unravelling or loosening of the land loops about the windings.

When the other end of the stator is to be laced, said end having the winding leads 250 extending therefrom and thus requiring less loop lacings than the first end, the button 261 is depressed to start the machine which brings into effect a separate counter permitting the fewer loops to be completed before the machine is finally and automatically stopped. For emergency stopping of the machine button 262 is pressed. A latter pressing of either buttons 260 or 261 after the button 262 has been pressed and the machine stopped, will cause the machine to operate and finish the entire operation as though button 262 had not been pressed.

The present machine, by using a single cord from a source of supply spool eliminates the need of shuttles. This simplifies the operation and reduces time and labor to a minimum.

While the embodiment of the present invention as herein disclosed, constitutes a preferred form, it is to be understood that other forms might be adopted.

What is claimed is as follows:

1. In a machine of the character described, the combination with a workpiece supporting table; a cord supply; a needle bar axially supporting a crocheting type needle having a hook end; a fulcrum block pivotally supported upon the machine and slidably carrying the end of the needle bar opposite the hook; a drive shaft providing two cams and a gear; a rack and pinion operatively connected to the bar and actuated by one cam to rotate said bar in both directions; a cam follower and links connected to the bar and actuated by the second cam for raising and lowering the hook end of said bar about its fulcrum block pivot; and a crank and rocker arm connected to the bar and actuated by the gear for reciprocating the bar longitudinally.

2. In a machine of the character described, the combination with a workpiece supporting table; a cord supply; a needle bar having a coaxial hook end portion of the crocheting needle type for catching the cord; a fulcrum block pivotally carried by the machine and supporting the needle bar adjacent the end opposite the hook; mechanism connected to the needle bar, said mechanism being operative to rotate the bar axially in opposite directions, to raise and lower the hook end of the bar by moving it about its pivotal fulcrum block, and to reciprocate the bar longitudinally, the mechanism for rotating the bar consisting of a pinion slidably keyed to said bar and rotatably mounted in the fulcrum block, a rack slidably carried in said block and operatively engaging the pinion, a rotatable cam, a cam follower, and levers connecting the cam follower with the rack for reciprocating it; and driving means for the mechanism which raises and lowers the bar and reciprocates it.

3. In a machine of the character described, the combination with a workpiece supporting table; a cord supply; a needle bar having a crocheting needle type hook end operative to catch the cord; a fulcrum block pivotally carried by the machine and supporting the needle bar adjacent the end opposite the hook; mechanism connected to the needle bar, said mechanism being operative to rotate the bar in opposite directions, to raise and lower the hook end of the bar by moving it in a vertical plane about its fulcrum, pivot block, and to reciprocate the bar longitudinally, the mechanism for raising and lowering the bar consisting of a rotatable cam, a cam follower, links connecting the cam follower with the needle bar; and driving means for the mechanism which rotates the bar and reciprocates it.

4. In a machine of the character described, the combination with a workpiece supporting table; a cord supply; a needle bar having a crocheting needle type hook end operative to catch the cord; a fulcrum block pivotally carried by the machine and supporting the needle bar adjacent the end opposite the hook; mechanism connected to the needle bar, said mechanism being operative to rotate the bar in opposite directions, to raise and lower the hook end of the bar by moving it about its fulcrum pivot block, and to reciprocate the bar longitudinally, the mechanism for reciprocating the needle bar longitudinally consisting of a rotatable gear, a crank rotated by said gear, a rocker arm pivotally secured to the machine and connected with the needle bar, a link connecting the crank and rocker arm; and driving means for the mechanism which rotates the needle bar and raises and lowers it.

5. In a machine of the character described, the combination with a workpiece supporting table; a cord supply; a needle bar having a hook end of the crocheting needle type for catching the cord; means on the machine, pivotally supporting the needle bar adjacent the end opposite the hook; mechanism connected to the needle bar and operative to rotate said bar and its needle axially in one direction and the other, to raise and lower the hook end of the bar by moving it about its pivotal support and to reciprocate the bar longitudinally, said mechanism comprising a rotatable drive shaft provided with two cams and a gear; a rack and pinion operative to rotate the bar, said pinion being slidably keyed to said bar and rotatably carried by the means pivotally supporting the needle bar, a cam follower engaging one cam and hingedly secured to the rack by a link, a cam follower engaging the second cam and connected by links with the needle bar, a crank rotated by said gear and linked to a rocker arm connected with the needle bar; and power means connected to the drive shaft for rotating it.

6. In a machine of the character described, the combination with a turntable supporting a workpiece; of a cord supply; a crocheting type needle operative to catch the cord and form and interlace loops of cord about portions of the work piece; a pivot block slidably supporting the needle; a mechanism operative to rotate the needle axially clock and counterclockwise substantially a half revolution; a mechanism operative to raise and lower the needle by moving it about its pivot; a mechanism operative to shift the needle longitudinally toward and away from the workpiece; rotatable cams respectively connected to the first two mentioned mechanisms for actuating them; a gear connected to the last mentioned mechanism for actuating it; and a power driven shaft upon which the cams and gear are mounted.

7. In a machine of the character described, the combination with a turntable supporting a workpiece; of a cord supply; a crocheting type needle operative to catch the cord for forming and interlacing loops of said cord about the workpiece; a rod, splined for a portion of its length at one end and having a chuck at its other end, said chuck receiving and securing the needle to said rod; spaced uprights on the machine; a fulcrum block pivotally supported between said uprights and having an opening through which the rod extends; a pinion keyed to the splined portion of the rod; anti-friction bearings supporting the pinion in the block, the axis of the pinion being at right angles to the pivoted center of the block; a rack slidable in the block and operatively engaging the pinion for turning it; whereby the needle rod is turned; and mechanism operative to reciprocate the rack while permitting said rack to oscillate with the pivoted fulcrum block.

8. A machine in accordance with claim 7 in which, however, a rotatable crank is connected with the needle rod by means, translating the rotary motion of the crank into reciprocatory movement, whereby the needle is reciprocated longitudinally in the pinion supported in the fulcrum block; raising and lowering mechanism connected to the needle bar, operative to move the needle bar and its supporting fulcrum block about the pivotal support of said block; and driving mechanism for the crank and the raising and lowering mechanism.

9. A machine in accordance with claim 7, in which, however, the mechanism operative to reciprocate the rack while permitting it to oscillate with the fulcrum block comprises a rotatable, barrel cam having an annular groove, portions of which have a predetermined rise and fall, a cam follower extending into said groove, said cam follower being slidably carried by a post secured to the machine, the cam follower being connected to the rack by a link hingedly secured to said rack and follower to permit sliding oscillation of the rack in the tilting fulcrum block.

10. In a machine of the character described, the combination with a turntable supporting a workpiece; a cord supply; a reciprocative needle of the crocheting type, operative to catch the cord, move it relatively to the workpiece to form and interlace cord loops about the workpiece for binding it; a main gear; a train of gears, predeterminately smaller than the main gear with which they are operatively connected so as to be driven thereby; means operative to reciprocate the needle, said means being driven by one of the train of gears; a driven disc, rotated by the last gear in the said train of gears, said disc having a lug extending therefrom; a Geneva gear disc rotatably mounted on the machine, said Geneva gear disc having a plurality of radially arranged slots engageable by the said lug for rotating the Geneva gear disc a predetermined portion of a revolution for each revolution of the driven disc; a pinion connected to the Geneva gear disc for rotating therewith; and gear teeth on the turntable, meshing with the pinion, whereby said turntable is rotated when the Geneva gear disc is rotated.

11. In a machine of the character described, the combination with a turntable supporting a workpiece, said turntable having an annular flange provided with gear teeth in its peripheral edge; a cord supply; a reciprocative crocheting needle operative to catch the cord and form and interlace loops of cord about the workpiece; a main driving gear; a train of three gears, each half the size of the main driving gear, operatively connected to said main gear so as to be rotated thereby; a crank rotated by the gear meshing with the main gear, said crank being operatively connected with the needle for reciprocating it longitudinally; a hub on the third and last of said train of gears; a driven disc secured coaxially to said hub; a lug extending from said disc toward the third gear; a Geneva gear disc having six, equally spaced slots extending radially inwardly from its peripheral edge, said slots being adapted to be successively entered by the lug on the driver disc, for rotating the Geneva gear disc one-sixth of a revolution for each complete revolution of said driver disc; and a pinion secured to the Geneva gear disc so as to rotate therewith, said pinion meshing with the toothed flange of the turntable and operative to rotate said turntable a predetermined fraction of a revolution for each rotating movement of the Geneva gear disc.

12. In a machine for binding the stacks of wires forming the end loops of windings extending from an electrical device, the combination with a table supporting an electrical device; of a cord supply; a crocheting type needle having a hook at its one end operative to catch the cord, said needle being movable longitudinally, at one level, toward the device and under a stack of its windings to catch the cord, and movable longitudinally, at the same level and in the opposite direction to pull a cord loop under said stack of windings, said needle then being movable longitudinally, at a higher level, toward and over the windings, again to catch the cord and draw a new loop over said windings and through the previously formed loop as said needle again moves in the opposite direction; mechanism connected to the needle and operative to rotate it axially in either direction; mechanism connected to the needle and operative to reciprocate the needle longitudinally; mechanism slidably and pivotally supporting the needle at the end opposite the hook and operative to permit raising and lowering of the hook end of the needle to proper levels relatively to the electrical device on the table of the machine; and driving means for said mechanisms, operative to render each active at properly timed intervals and in recurrent sequence, one relatively to the other.

13. In a machine of the character described, the combination with a turntable supporting a workpiece; of a cord supply; a crocheting type needle longitudinally movable back and forth at a predetermined low level and then at a predetermined higher level relatively to said workpiece, said needle being operative to catch the cord and form and interlace cord loops about the workpiece; a cord threader-guide axially carried by the turntable, said guide being movable longitudinally and rotatably to hold the cord in positions catchable by the needle in either its lower or its higher levels; driving means operative to reciprocate the needle; driving means operative to rotate the guide back and forth through a predetermined arc; and common actuating means for raising and lowering the needle and the threader-guide.

14. In a machine of the character described, the combination with a turntable supporting a workpiece; of a cord supply; a crocheting type needle longitudinally movable back and forth at a predetermined low level and then at a predetermined higher level relatively to said workpiece, said needle being operative to catch the cord and form and interlace cord loops about the workpiece; a cord threader-guide axially carried by the turntable, said guide being movable longitudinally and rotatably to hold the cord in positions catchable by the needle in either its lower or its higher levels; driving means operative to reciprocate the needle; driving means operative to rotate the guide back and forth through a predetermined arc; a lever pivoted at one end and connected to the threader-guide at the other; and driving means connected to both said lever and the needle, said driving means being operative concurrently to raise and lower the said guide and needle through their respective ranges of up and down movement.

15. In a machine of the character described, the combination with a centrally apertured turntable supporting a workpiece; of a cord supply; a crocheting type needle pivotally supported adjacent its one end and having three distinct movements, rotating, raising and lowering, and longitudinally reciprocating, the hook end of said needle being adapted to catch the cord and form and interlace loops of cord about the workpiece; a threader longitudinally slidable and rotatably supported in the central aperture of the turntable, said threader consisting of a tubular member having a bracket at its upper end and supporting a tubular guide radially of the tube, the cord extending through said tube and guide; a lever pivoted at one end and connected at its other end to the threader; driving means connected to the needle and operative to rotate said needle back and forth through an arc of approximately 180°; another driving means connected to the needle and operative to reciprocate it longitudinally between predetermined forward and rearward positions; and a common actuating means connected to both the needle and the lever of the threader, said actuating means being operative concurrently to raise and lower said threader and needle into predetermined upper and lower positions, the range of this movement by the needle being less than the range of movement of the threader, whereby the cord is held available to be caught by the needle as said needle moves from its forward toward its rear position.

16. In a machine of the character described, the combination with a centrally apertured turntable supporting a workpiece; of a cord supply; a crocheting type needle pivotally supported adjacent its one end and having three distinct movements, rotating, raising and lowering, and longitudinally reciprocating, the hook end of said needle being adapted to catch the cord and form and interlace loops of cord about the workpiece; a threader longitudinally slidable and rotatably supported in the central aperture of the turntable, said threader consisting of a tubular member having a bracket at its upper end, a tubular guide supported radially of the tube, the cord extending through said tube and guide; a lever pivoted at one end and connected at its other end to the threader; driving means connected to the needle and operative to rotate said needle back and forth through an arc of approximately 180°; another driving means connected to the needle and operative to reciprocate it longitudinally between predetermined forward and rearward positions; and a common actuating means connected to the needle in closer proximity to its hook end than to its pivoted end, and connected to the threader lever in closer proximity to its pivoted end than to the end attached to the threader, said actuating means being operative concurrently to raise and lower said threader and needle, the former to higher and lower predetermined positions than the latter, whereby said threader, with its guide, will hold the cord relatively to the needle so that the hook of the needle catches said cord as said needle recedes from its foremost positions.

17. In a machine of the character described, the combination with a turntable supporting a workpiece, said turntable having an axial opening; of a cord supply; a threader through which the cord extends, said threader being supported in the opening of the turntable so as to be rotatable and longitudinally reciprocative; driving mechanism including a train of gears and a Geneva wheel; a driver operative to rotate the turntable periodically through a predetermined portion of a revolution; a crank rotated by the Geneva wheel driver; and a link connected to the crank and threader, operative to oscillate the threader through a predetermined arc of movement.

18. In a machine of the character described, the combination with a turntable for supporting a workpiece, said turntable having an axial opening; of a cord supply; a threader through which the cord extends, said threader being supported in the opening of the turntable so as to be rotatable and longitudinally reciprocative; driving mechanism including a train of gears and a Geneva wheel; a driver operative to rotate the turntable periodically through a predetermined portion of a revolution; a stud adjustable secured to the Geneva wheel driver and extending eccentrically therefrom; a collar on the threader; a link connecting the stud with said collar operative to rotate the threader in one direction and the other in response to rotation of the said driver; a lever pivotally anchored at one end and connected to the threader at its other end; and actuating means connected to the lever, operative to move the lever for reciprocating the threader longitudinally.

19. In a machine of the character described, the combination with a turntable for supporting a workpiece, said turntable having an axial opening; of a cord supply; a threader through which the cord extends, said threader being supported in the opening of the turntable so as to be rotatable and longitudinally reciprocative; driving mechanism including a train of gears and a Geneva wheel and driver, operative to rotate the turntable periodically through a predetermined portion of a revolution; a rod, pivotally supported adjacent one end upon the machine; a crocheting type needle attached to the other end of said rod so as to be coaxial therewith; motion transmitting means connecting the Geneva wheel driver with the threader, said means being operative to rotate said threader back and forth through a predetermined arc in response to rotation of said driver; a link pivotally anchored at one end and secured to the threader at its other end; and common actuator connected to both the needle bearing rod and the link, said actuator being operative concurrently to reciprocate the threader and the said rod in the same direction.

20. A machine in accordance with claim 19 in which, however, the actuator is so attached to the needle bearing rod and the link that said actuator operates, concurrently to reciprocate the threader up and down through a predeterminately greater range of movement than the said rod, whereby the threader end, from which the cord extends, is positioned above the needle at their top positions and below the needle at their bottom positions.

21. A machine for binding winding loops protruding from the end of an electric stator, comprising in combination, a turntable upon which the stator is placed; a supply of cord; a crocheting type needle operative to catch the cord and form, wrap and interlace loops of cord about said winding loops; mechanisms operative to rotate the needle and reciprocate it up and down and longitudinally; and driving means connected to said mechanisms for actuating them at predetermined intervals in recurrent sequence.

22. A machine in accordance with claim 21 in which, however, a normally closed scissors is mounted upon the machine; pivoted means normally closing the scissors but operative out of normal position to open the scissors and to hook the cord draw it into the scissors as said means returns to normal position, whereby the cord is severed; and a hydraulically actuated piston connected to said means for operating it.

23. In a machine of the character described, the combination with a workpiece supporting table; a cord supply; a shaft having a crochet type needle hook at one end and axially thereof, said hook being operative to catch the cord; means on the machine pivotally supporting the shaft at a point thereon remote from the hook to permit tilting of the shaft relatively to the table; mechanism connected to said shaft, operative to rotate said shaft about its axis in one and the other direction, to tilt said shaft toward and away from the table, and to reciprocate said shaft longitudinally; and driving means connected to said mechanism, operative to effect the several movements of the shaft and needle in properly timed, recurrent sequence.

24. In a machine of the character described, the combination with a turntable supporting a work piece; a crocheting type needle having a hook end operative to catch the cord and draw it through and around portions of the work piece for forming interlaced binding loops about said portion of the work piece; means on the machine pivotally supporting the needle at a point remote from its hook end, for permitting titling of said needle relatively to the turntable; mechanism connected to said needle, operative to rotate the needle about its own axis in either direction, to tilt the needle so that its hook end is moved toward and away from the turntable, and to reciprocate said needle longitudinally; and means operatively connected to said mechanism for actuating it to effect the several movements of the needle in properly timed and recurrent sequence.

25. In a machine of the character described, the combination with a turntable detachably supporting work pieces; a cord supply; a crocheting type needle having a hook end operative to catch the cord and draw it through and about portions of a work piece to form and interlace binding loops about the work piece; means on the machine pivotally supporting the needle at a point remote from its hook end to permit tilting of the needle relatively to the work piece; actuators connected to the needle, one actuator being operative to rotate the needle about its own axis in either direction, another actuator being operative to tilt the needle relatively to the work piece, and another actuator being operative to reciprocate the needle longitudinally toward and away from the work piece; driving means connected to said actuators for operating them to effect the several needle movements at properly timed intervals; means connected to the turntable and operative to rotate said table through predetermined portions of a revolution at recurrent, timed intervals; and means for limiting machine operation to a predetermined number of needle reciprocations.

26. In a machine of the character described, the combination with a turntable detachably supporting work pieces; a cord supply; a bar; a crochet type needle attached to one end of the bar so as to be in axial alignment therewith, said needle having a hook operative to catch the cord and move it for forming interlaced binding loops about a portion of each work piece; means on the machine pivotally supporting the bar at a point remote from the needle thereon for permitting tilting of the bar relatively to the turntable; a barrel cam having two camming slots; a cam follower in one slot; a lever attached to said cam follower and operatively connected to the bar for rotating said bar and its needle in opposite directions; another cam follower in the second cam slot; links connected to said other cam follower and to the bar at a point between the needle and the pivotal support for the bar, for tilting said bar; interconnected movement transmitting elements, one of which is attached to the barrel cam so as to be rotated thereby, another operating a crank attached to the bar for reciprocating said bar longitudinally, another of said elements operatively engaging and driving intermittent motion transmitting means connected to the turntable; and driving means connected to the cam.

27. A machine in accordance with claim 26 in which, however, a threader is provided centrally of the turntable; and means actuated by the second cam follower and connected to the threader, said means being operative to move the threader in either direction axially of the turntable and in accordance with the tilting movement of the bar.

28. A machine in accordance with claim 27 in which, however, a cord threader is provided centrally of the turntable said threader being capable of longitudinal and rotating movements; means actuated by the links that tilt the needle bar being connected with the threader for moving it longitudinally through the turntable in accordance with the tilting movements of the needle bar; and means driven by one of the interconnected movement transmitting elements, connected to the threader for rotating it in one direction and the other in accordance with the rotation of the needle bar.

FRANK E. WIRTZ.

REFERENCES CITED

The following references are of record in the file of this patent:

UNITED STATES PATENTS

| Number | Name | Date |
| --- | --- | --- |
| 966,746 | Hoefer | Aug. 9, 1910 |
| 2,075,213 | Lindner | Mar. 30, 1937 |
| 2,340,291 | Wirtz | Feb. 1, 1944 |
| 2,348,746 | Nardulli | May 16, 1944 |
| 2,437,990 | Askey | Mar. 16, 1948 |
| 2,465,665 | Slavek | Mar. 29, 1949 |